United States Patent [19]

Maiocchi

[11] Patent Number: 5,343,127
[45] Date of Patent: Aug. 30, 1994

[54] START-UP PROCEDURE FOR A BRUSH-LESS, SENSORLESS MOTOR

[75] Inventor: Giuseppe Maiocchi, Villa Guardia, Italy

[73] Assignee: SGS-Thomson Microelectronics, S.r.l., Agrate Brianza, Italy

[21] Appl. No.: 969,693

[22] Filed: Oct. 30, 1992

[30] Foreign Application Priority Data

Oct. 31, 1991 [IT] Italy .................. VA91A0040

[51] Int. Cl.$^5$ .............................. H02P 1/00
[52] U.S. Cl. .................... 318/254; 318/439
[58] Field of Search .......... 318/254, 439, 138, 561, 318/685, 696

[56] References Cited

U.S. PATENT DOCUMENTS

| | | | |
|---|---|---|---|
| 4,169,990 | 10/1979 | Landman | 318/138 |
| 4,461,066 | 2/1987 | Nagata et al. | 318/254 |
| 4,510,422 | 4/1985 | Ogura | 318/254 |
| 4,594,536 | 6/1986 | Tamagaki | 318/561 |
| 4,603,283 | 7/1986 | Oltendorf | 318/254 |
| 4,678,973 | 7/1987 | Elliott et al. | 318/254 |
| 4,743,815 | 5/1988 | Gee et al. | 318/254 |
| 4,752,724 | 6/1988 | Dodzwill et al. | 318/254 |
| 4,814,674 | 3/1989 | Hrassky | 318/254 |
| 4,922,169 | 5/1990 | Freeman | 318/254 |
| 4,961,038 | 10/1990 | MacMinn | 318/696 |
| 5,017,845 | 5/1991 | Carbolante et al. | 318/138 |
| 5,028,852 | 7/1991 | Dunfield | 318/254 |
| 5,151,640 | 9/1992 | Sakamoto et al. | 318/696 |

FOREIGN PATENT DOCUMENTS

| | | |
|---|---|---|
| 0449687 | 3/1991 | European Pat. Off. . |
| 4009258 | 3/1989 | Fed. Rep. of Germany . |

OTHER PUBLICATIONS

EPE '89, vol. 3, Oct. 12, 1989, pp. 1219–1222 L. Cardoletti et al., *'Indirect Position Detection at Standstill for Brushless DC and Step Motors'*.

IECON '87, pp. 228–234, Watanabe et al., *'DC-Brushless Servo System without Rotor Position and Speed Sensor'*.

1989 IEEE, pp. 215–218, Lin et al., *'Using Phase-Current Sensing Circuit as the Position Sensor for Brushless DC Motors Without Shaft Position Sensor'*.

IEEE Transactions on Industry Applications, vol. 27, No. 5, Sep./Oct. 1991, Ogasawara et al., *'An Approach to Position Sensorless Drive for Brushless DC Motors'*.

1990 IEEE, pp. 448–453, Matsui et al., *'Brushless DC Motor Control without Position and Speed Sensors'*.

1989 IEEE, pp. 52–53, WAM 4.3, Bahlmann et al, *'A Full-Wave Motor Drive IC Based on the Back-EMF Sensing Principle'*.

*Primary Examiner*—Jonathan Wysocki

[57] ABSTRACT

A method for starting-up in a desired forward sense of rotation a multiphase, brushless, sensorless, DC motor, while limiting the extent of a possible backward rotation. First, a predetermined initial phase is excited (thereby accelerating the rotor toward an equilibrium position for that initial phase), for only a fraction of the time necessary for the accelerated rotor to travel through a nearest angular position which would determine a "zero-crossing" in the waveform of any one of the back electromotive forces (BEMFs) which are induced by the rotor on the windings of the motor. After the elapsing of this brief impulse of excitation, the sign of the BEMFs induced in the windings of the motor are digitally read thus producing a first reading. The occurrence of a first "zero-crossing" event is monitored, and, if this happens within a preset interval of time subsequent to the instant of interruption of the first excitation impulse, the optimal phase to be excited first for accelerating the motor in the desired direction is decoded through a look-up table, and the start-up process may proceed. If such a zero-crossing occurrence is not detected within said period of time, the routine is repeated by exciting a different phase, which is functionally shifted by two phase positions from the initial phase. The maximum backward rotation that may occur in the worst of cases is sensibly less than the angular distance which separates two adjacent equilibrium positions of the rotor and in practice may be of just few degrees.

26 Claims, 17 Drawing Sheets

■ STABLE EQUILIBRIUM POINTS OF PHASE AB̄

⊙ UNSTABLE EQUILIBRIUM POINTS OF PHASE AB̄

- INITIAL REST POSITION: $C\bar{B}$
- EXCIT: $C\bar{A}$   FIRST MOVEMENT DIRECTION: FORWARD
- STATUS OF COMPARATOR BEFORE ZERO CROSS: 6
-     "          "        AFTER   "   "  : 2

- INITIAL REST POSITION: AB̄
- EXCIT: CĀ    FIRST MOVEMENT DIRECTION: FORWARD
- STATUS OF COMPARATOR BEFORE ZERO CROSS: 4
-      "          "       AFTER    "    "  : 6

- INITIAL REST POSITION: CĀ
- EXCIT: CĀ→BC̄      FIRST MOVEMENT DIRECTION: FORWARD
- STATUS OF COMPARARATOR BEFORE ZERO CROSS: 2
-       "           "         AFTER    "    "   : 3

- INITIAL REST POSITION: BC̄
- EXCIT: CĀ          FIRST MOVEMENT DIRECTION: BACKWARD
- STATUS OF COMPARARATOR BEFORE ZERO CROSS: 6
-     "          "        AFTER    "    "   : 4

AREAS ① ③ : THEORETICAL MAX. EXCITING TORQUE
AREAS ② ④ : THEORETICAL MAX BRAKING TORQUE

AREA ① < AREA ②
AREA ③ < AREA ④

START-UP PROCEDURE FOR A BRUSH-LESS, SENSORLESS MOTOR

BACKGROUND AND SUMMARY OF THE INVENTION

The present invention relates to a technique for starting an electronically switched, brushless, multi-phase, DC motor, without rotor position sensors.

The use of brushless DC motors is increasingly popular because of the low electrical noise generated by these motors. In such motors, a permanent-magnet rotor is typically used, and switching transistors drive current through the various stator windings. Commonly three stator windings are used, connected in a star-configuration. By connecting one of the three stator windings to a current source and another to a current sink, six different phases of stator magnetization can be defined.

If position-sensing devices (such as Hall-effect or optical sensors) are used to detect the instantaneous shaft position, then electronic switching can completely substitute for the commutation functions formerly performed by brushes. However, the sensors themselves add a cost and reliability penalty. Thus, substantial work has been invested, during the past decade, in eliminating the use of position sensors in such motors.

Once the motor is operating, the rotor position can be detected from the induced voltage on the stator windings (which will vary depending on the position and velocity of the rotor). Such back electromotive forces (BEMFs) can be detected differentially, with reference to the applied voltages. By processing these signals in order to determine the actual position of the rotor, and accordingly synchronizing switching of the excitation current through the phase-windings, the motor can be efficiently commutated.

Many systems are known for processing signals representative of these induced back electromotive forces, each having intrinsic advantages and drawbacks.[1]

[1] See, e.g., Ogasawara et al., "An approach to position sensorless drive for brushless DC motors," 27 IEEE TRANSACTIONS ON INDUSTRY APPLICATIONS p 928-933 (September-October 1991); Matsui et al., "Brushless DC motor control without position and speed sensors," 1990 IEEE INDUSTRY APPLICATIONS SOCIETY ANNUAL MEETING; Ogasawara et al., "An approach to position sensorless drive for brushless DC motors," 1990 IEEE INDUSTRY APPLICATIONS SOCIETY ANNUAL MEETING; Pouilloux, "Full-wave sensorless drive ICs for brushless DC motors," ELECTRONIC COMPONENTS & APPLICATIONS v 10 n 1 1990 p 2-11 (1990) (ISSN: 0141-6219); Lin et al., "Using phase-current sensing circuit as the position sensor for brushless DC motors without shaft position sensor," 15TH ANNUAL CONFERENCE OF IEEE INDUSTRIAL ELECTRONICS SOCIETY-IECON '89; Bahlmann, "Full-wave motor drive IC based on the back-EMF sensing principle," INTERNATIONAL CONFERENCE ON CONSUMER ELECTRONICS 1989; Watanabe et al., "DC-Brushless Servo System without Rotor Position and Speed Sensor," PROCEEDINGS-IECON '87 (1987 International Conference on Industrial Electronics, Control, and Instrumentation); all of which are hereby incorporated by reference.

However, all such sensorless motors face a start-up problem: because the induced electromotive forces signals are not present when the motor is at rest, the starting position of the rotor is unknown. For this reason, several start-up procedures have been developed in order to overcome this technical difficulty.

A first, known, start-up procedure consists in initially exciting a certain winding, in order to call the rotor toward an equilibrium point (null-torque position) relative to said excited phase.[2] After a number of oscillations of the rotor about the equilibrium point, the rotor eventually stops in such a pre-established startup position. Thereafter, by selecting this initial excitation for start-up in a desired direction with maximum torque, the motor may be started in an optimal manner.

[2] For example, if the motor has three windings, a complete excitation sequence comprises six different excitation phases. If the motor has 36 equilibrium points per revolution, each phase has six stable equilibrium points and six points of instability per revolution.

The principal drawbacks of this start-up procedure are a possible backward rotation during the phase of alignment of the rotor with the certain, fixed, start position, and a relatively long time required by the start-up procedure.

According to another known start-up procedure, the phase-windings of the motor are excited sequentially several times at a variable frequency. By starting with a certain frequency and by increasing the frequency so as to force the rotor to follow in an open-circuit mode the excitation sequence of the phases, the rotor accelerates until it reaches a speed at which induced back electromotive force signals (BEMFs) may be detected and processed.

The drawback of this procedure is that the rotor may not properly follow the excitation sequence, and may tend to oscillate about several equilibrium positions or to rotate backward.

A third, known, start-up procedure consists in measuring the inductance and the mutual inductance of the phase-windings of the motor. From the measured values it is possible to determine the actual position of the rotor.

A drawback of this procedure is that it is based on the results of measurements which depend from the particular construction of the motor and therefore the system, which is relatively complex, must be adapted, case by case, to the type of motor.

Other known start-up procedures are based mainly on a sequential excitation under open-circuit conditions, and differ among each other in the manner the accelerating sequence and the repetition thereof are carried out.

In many applications, backward rotation at startup must be avoided. For example, in magnetic disk drives for computers, a non-negligible backward rotation may damage the reading heads.

Thus, there is still a need for a fast, start-up procedure which will prevent backward rotation, and which is practically independent of the fabrication characteristics of the motor, and which can be implemented in an integrated circuit, preferably in the form of hard-wired logic.

These objectives are achieved with the start-up system provided by the present invention, which implements a start-up procedure which comprises: exciting a predefined phase to call the rotor toward an equilibrium point relative to said excited phase, for a pre-established fraction of the time necessary to the accelerated rotor, depending on its inertia characteristics, to reach a nearest position at which the BEMF which is induced by the motion of the rotor in any one of the phase-windings of the motor undergoes a "zero-crossing" (change of sign), and, before the occurrence of such a nearest "zero-crossing" event, digitally reading the output configuration of a plurality of comparators which assess the induced BEMFs on the phase-windings of the motor, detecting thereafter the occurrence of such a first "zero-crossing" event by one of said induced BEMFs within a pre-established period of time following the instant of said interruption of said first excitation; if said "zero-crossing" event occurs, reading a second time the output configuration of said comparators and decoding, by processing said first and second readings, the position of the rotor in respect to the phase-windings of the motor, and therefore the phase to be excited next in order to accelerate the rotor in the desired sense of rotation with a maximum torque; if said "zero-crossing" event does not occur before the termination of said pre-established period of time following the instant of interruption of said first excitation current pulse, repeating the process by exciting a different phase of the motor which is functionally shifted angularly by two phases as compared to said predefined phase.

In practice, in the worst case which may exist at the start-up instant, the maximum backward rotation of the rotor which may occur is less than an angle of rotation equivalent to the angular separation between two poles (or equilibrium positions) of the motor. For example, in the case of a motor having 36 equilibrium positions, the maximum possible backward rotation which may occur in the worst of cases, will be limited to less than (360/36) 10 degrees. In practice a maximum back rotation of about 7–8 degrees is experienced. According to a preferred embodiment, the start-up procedure further comprises a preliminary step during which all the phases of the motor are sequentially excited one or several times, each phase for a fraction of said pre-established duration of said first excitation step of the predefined phase, in order to eliminate the static component of friction, without actually moving the rotor from its rest position. This preliminary sequential excitation of the phases for periods of time insufficient to move the rotor from its rest position, determines a mechanical preconditioning of the motor which will facilitate the ensuing performance of the real start-up procedure.

The disclosed innovations provide methods, circuits and systems for starting-up in a desired forward sense of rotation a multiphase, brushless, sensorless, DC motor, while limiting the extent of a possible backward rotation. First, a predetermined initial phase is excited (thereby accelerating the rotor toward an equilibrium position for that initial phase), for only a fraction of the time necessary for the accelerated rotor to travel through a nearest angular position which would determine a "zero-crossing" in the waveform of any one of the back electromotive forces (BEMFs) which are induced by the rotor on the windings of the motor. After the elapsing of this brief impulse of excitation, the sign of the BEMFs induced in the windings of the motor are digitally read thus producing a first reading. The occurrence of a first "zero-crossing" event is monitored, and, if this happens within a preset interval of time subsequent to the instant of interruption of the first excitation impulse, the optimal phase to be excited first for accelerating the motor in the desired direction is decoded through a look-up table, and the start-up process may proceed. If such a zero-crossing occurrence is not detected within said period of time, the routine is repeated by exciting a different phase, which is functionally shifted by two phase positions from the initial phase. The maximum backward rotation that may occur in the worst of cases is sensibly less than the angular distance which separates two adjacent equilibrium positions of the rotor and in practice may be of just few degrees.

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
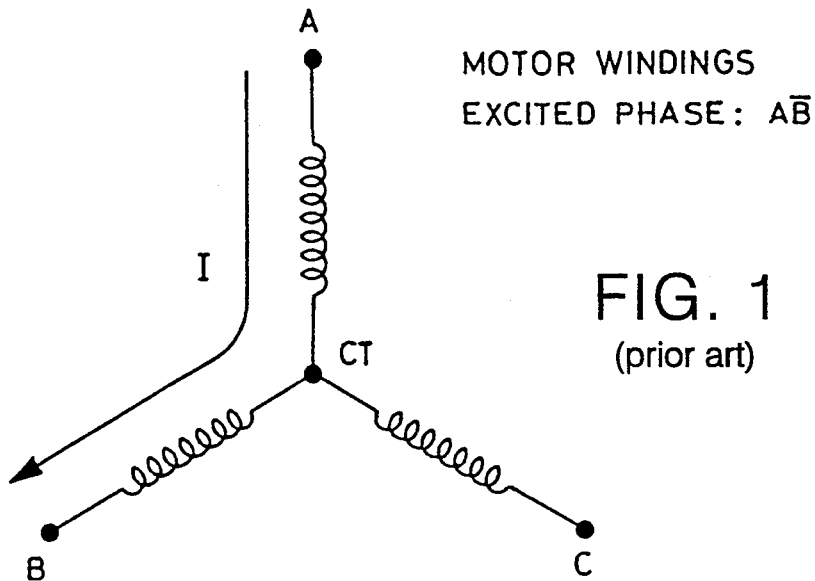
FIGS. 1, 2 and 3 illustrate the operation of a star-configured three phase motor, having N number of poles for six distinct phases of excitation.

The set of figures refer to the case of a three-winding motor, in a star configuration, i.e. having six different, excitable phases, and an N number of poles. Therefore, there will be 6×N equilibrium points in a complete revolution of the rotor. In the following description, each excitation phase is indicated with two capital letters: a first letter (A, B or C) designates the winding through which the current conventionally flows from a supply terminal toward the star center (CT), a second capital letter, preceded by a "!" sign (or topped by a horizontal bar), designates the winding through which the current, coming from the star center (CT) flows toward another supply terminal (re: FIG. 1).

For each excited phase, the rotor tends to dispose itself in coincidence with one of the stable equilibrium points relative to the particular phase of excitation, therefore for a total of six phases there will be 6×N equilibrium points in a complete revolution and there will be as many points of mechanically unstable equilibrium which will be shifted by 180 electrical degrees from the respective stable equilibrium point.

Figure 2:
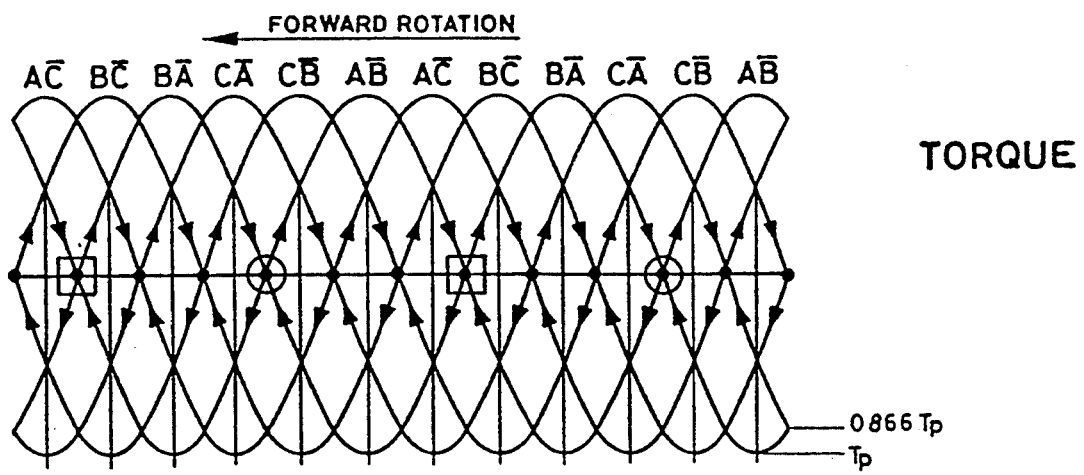
Figure 3:
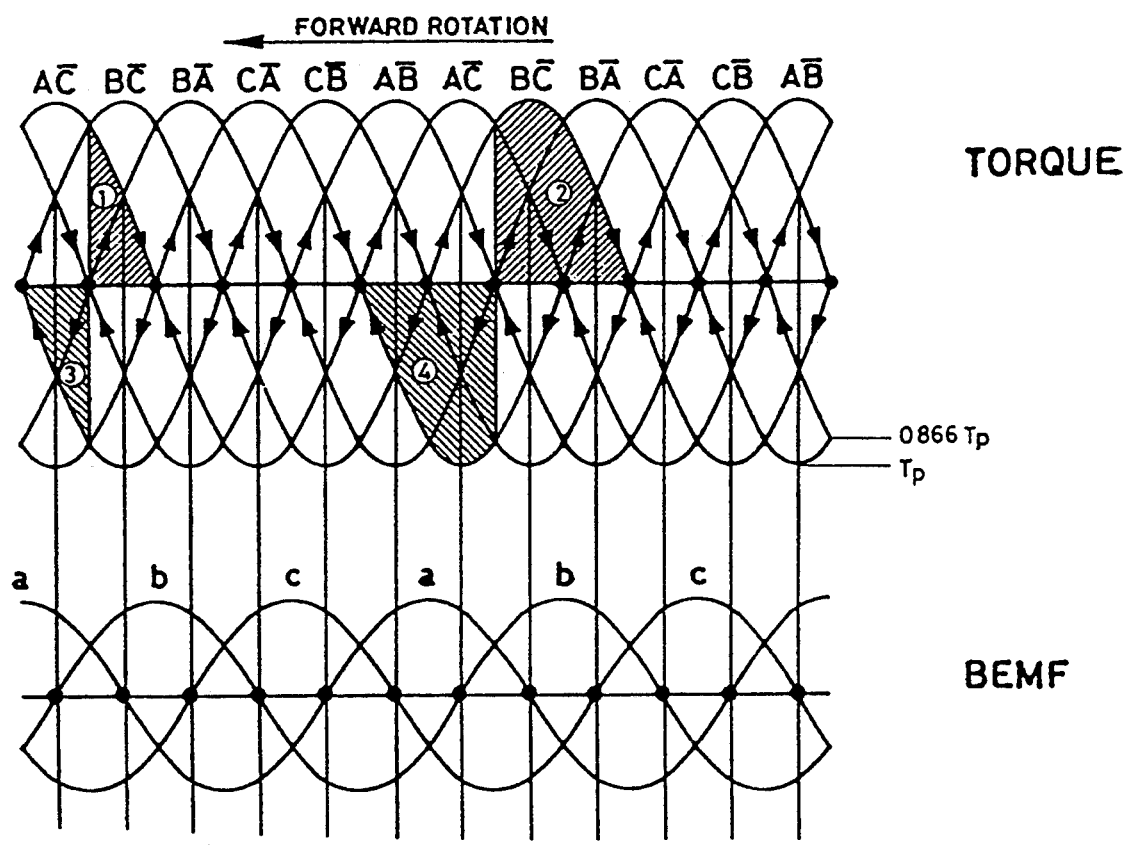

For example, by exciting the phase A!B, the equilibrium and instability points of the rotor will be those indicated in FIG. 2, which shows the torque curves of the motor in relation to the different phases of excitation. When the motor stops and the electrical excitation ceases, the rotor may casually align itself with any one of the different equilibrium points. For each of these rest positions of the rotor there will be a phase which, if excited, will produce upon the rotor a maximum start-up torque in a certain direction of rotation. For example, if the rotor is at rest in a stable equilibrium position relative to the phase A!B (as shown in FIG. 2), the excitation of the six different phase of the motor would produce a torque on the rotor according to the following scheme:

| Excited Phase | Instantaneous Relative Impulse of Torque Start-up Torque as Depicted in FIG. 3 |
|---|---|
| A!C | $-\sqrt{3}/2 \, T_p$ |
| B!C | $-\sqrt{3}/2 \, T_p$ |
| B!A | $0 \, T_p$ |
| C!A | $+\sqrt{3}/2 \, T_p$ |
| C!B | $+\sqrt{3}/2 \, T_p$ |
| A!B | $0$ |

$T_p$ represents the peak value of the torque curves and such a value is correlated, through a torque constant of the motor ($K_t$, in units of Nm/A), to the excitation current of the motor. The (−) sign conventionally means that the torque will start-up the rotor in a backward direction of rotation.

From the above table, and by observing also the respective torque curves of FIG. 3, as well as the corresponding curves of the three induced BEMFs which are also shown therein, it is evident that the phase to be excited first in order to achieve the maximum start-up torque in a forward direction of rotation is the phase C!A.

Moreover it is evident that by exciting casually one of the six phases while the rotor is at rest and casually aligned with any of the different equilibrium points, either a forward motion or a backward motion or no motion at all may occur.

Figure 4:
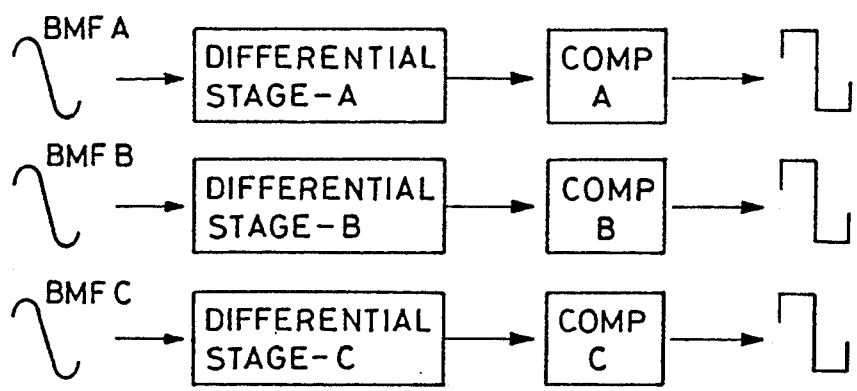
FIG. 4 is a partial block diagram of the three differential amplifiers and of the three comparators connected in cascade to the differential amplifiers, which are used for amplifying and evaluating the signs of the BEMFs induced in the three windings of the motor.

As shown in the partial block diagram of FIG. 4, the BEMFs induced by the rotation of the rotor on the windings of the motor, namely: BEMF-A, BEMF-B and BEMF-C, may be detected and amplified by the use of the (conventionally connected) differential amplifiers A, B and C. The output of these differential amplifiers is evaluated by the use of respective hysteresis comparators: COMP-A, COMP-B and COMP-C, which may be for example "Schmitt-trigger" comparators. The readable digital data given by the output configuration of the comparators of FIG. 4 may be utilized for establishing the actual position of the rotor and its direction of rotation if the motor is disexcited for a certain interval of time during the reading.

Figure 5:
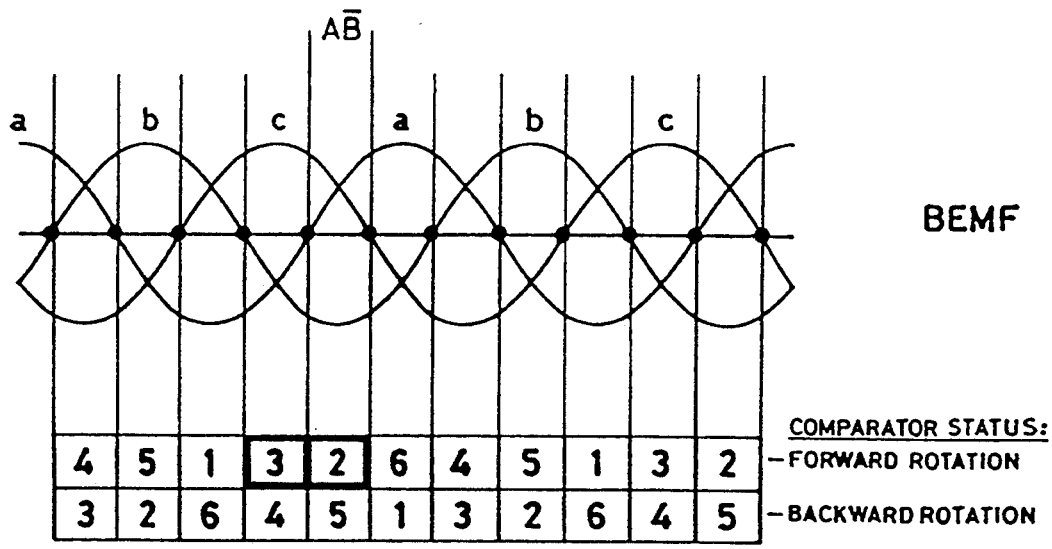
FIGS. 5 and 6 show the manner in which the output configuration of the three comparators of the block diagram of FIG. 4 is digitally read in order to produce bit-to-bit complementary data for the two senses of rotation.
Figure 6:
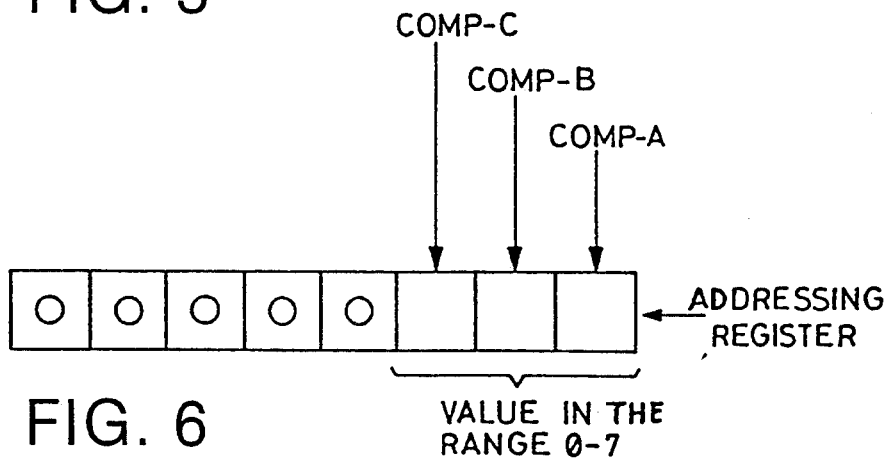

In fact, as may be observed in FIG. 5, the state (polarity) of the BEMFs will not change between two successive "zero-crossing" events, therefore any position of the rotor between two subsequent "zero-crossing" events is unequivocally represented by a certain state of the output of the comparators. Therefore, if the output configuration of the comparators is digitally read and if a "0-weight" bit is associated with the comparator relative to the phase-winding A, a 1-weight bit to the comparator relative to the phase-winding B and the 2-weight bit to the comparator relative to the phase-winding C, a data having a value comprised between 0 and 7 may be derived by reading the output configuration of the three comparators, as depicted in FIG. 6.

In the table at the base of the diagrams representing the BEMFs of FIG. 5, the read values of the output configuration of the three comparators of FIG. 4 are indicated for the different possible positions of the rotor and for a given sense of rotation.

As it may be observed, a certain data corresponding to a relative output configuration of the comparators is assigned to each position of the rotor between two subsequent "zero-crossing" positions and this data is different depending upon the sense of rotation of the rotor in reaching said position.

The data corresponding to the output state of the comparators for each position of the rotor moving in a forward direction is in practice bit-to-bit complementary to the data in case backward rotation. This because of the fact that the sign of the BEMF signals is inverted when the motor changes direction of rotation. For example, if at a certain instant the rotor is aligned with the phase A!B, the data read will be 2 if the rotor is moving in a forward rotation or 5 if the rotor is rotating backward. This is due to the sign of the back electromotive forces which are induced in the windings in one case and in the other case.

Figure 7:
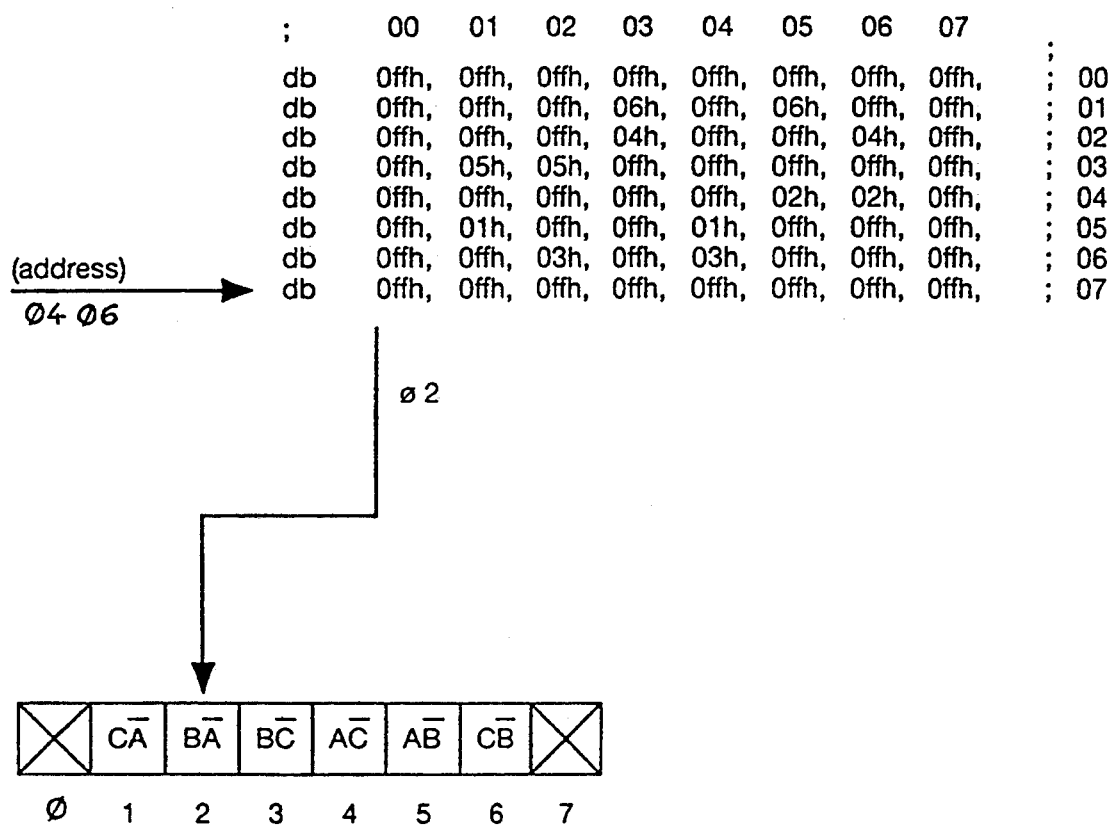
FIG. 7 depicts a "look-up" decode table for the optimal phase to be excited in order to accelerate the motor in the desired direction or to brake the rotor, should it have been initially started in an opposite (backward) direction, in function of the data read from the comparators before and after a "zero-crossing" event.

This fact is important because when the motor changes direction of rotation the data read at the output of the comparators are bit-to-bit complementary. This means that upon an inversion of rotation, a "pseudo-zero-crossing" event is generated and this "pseudo-zero-crossing" event is fundamental for the start-up algorithm of the method of the present invention, as will be more fully described hereinafter. In function of the addresses (codes) obtained in the form of digital data corresponding to the output configuration of the comparators, before and after a "zero-crossing" event, and which unequivocally identify the actual position and sense of rotation of the rotor, it is possible to employ a so-called "look-up table" (or code-table) purposely created for decoding (identifying) the optimal phase of excitation in order to start-up the motor in the desired direction (forward rotation) with a maximum start-up torque. For the example shown, such a "look-up table" is schematically illustrated in FIG. 7. The start-up process of the invention, according to a preferred embodiment, may be illustrated in the form of an algorithm by the flow-chart of FIG. 8.

Preferably, before initiating the start-up procedure, a brief sequential excitation of all the phases of the motor may be carried out once or several times, by sequentially exciting each phase for an extremely short time, insufficient to start-up the rotor, in order to eliminate or reduce static friction and therefore place the motor, still at rest, in a more favorable condition for performing a real start-up routine. Of course, this "preconditioning" phase is not strictly necessary and may also not be carried out. The real start-up procedure begins by exciting a predefined phase of the motor (it is irrelevant which phase is predefined and in the following description and in the set of examples which follows the phase C!A is supposed to be the predefined phase). The predefined phase is excited for a preset period of time T0, the length of which represents the only parameter which must be adapted to the inertial characteristics of the system which is associated with the rotor of the motor. The larger the inertia of the system, the longer should be this preset time T0. The time T0 must be sufficiently long for the impulse of torque which is imparted to the rotor to be able to move (accelerate) the rotor from its rest position toward an equilibrium position relative to said predefined first excited phase. On the other hand the time T0 must be short enough to elapse before the rotor, eventually accelerated toward a relative equilibrium position, has travelled by an angular distance long enough to cause the occurrence of a first "zero-crossing" event in the waveform of any one of the back electromotive forces which are induced in the windings of the motor, i.e. by an angular distance equivalent to $\frac{1}{2}$ the angular separation distance between two pulse or equilibrium positions. At the end of the preset period of time T0, said first excitation of the predefined phase is interrupted, leaving the rotor to proceed by inertia toward the equilibrium position relative to the excited phase and at that point, after a masking time sufficiently long for the transient phenomena following the interruption of the excitation current to decay, a first reading of the output configuration of the comparators is effected (eventually recording the data read) before the rotor, so accelerated by the brief impulse of torque received, reaches a position such as to produce a first "zero-crossing" event in any one of the induced BEMFs.

After the eventual occurrence of a first "zero-crossing" event in an induced BEMF, the changed output configuration of the comparators is read again. The data relative to the two successive readings of the output configuration of the comparators, before and after the occurrence of a first "zero-crossing" event in the waveform of the induced BEMFs, respectively, are utilized as decoding addresses (codes) of a "look-up table". The first reading decodes the row and the second reading decodes the column of the "look-up table", or vice versa. The phase as decoded through the "look-up table", represents the optimal phase to be excited in order to start-up the motor in the desired direction (forward rotation) with a maximum start-up torque. By observing the "look-up table" of FIG. 7, it is easily recognized that the optimal phase of excitation is practically determined by the first reading alone which decodes the row. In fact the decoding values belonging to the same row are all the same. The second reading, which is effected after a first "zero-crossing" event, is necessary as a confirmation of the first reading. In fact, if the value read during a first reading is for example 0-2 (which decodes the third row of the table) then the second reading should give 0-6 or 0-3 (i.e. must decode the fourth or the sixth column of the table). If this does not happen, it means that some inconvenience may have occurred (for example, a false first reading due to a persistence of transient phenomena). As a consequence a code (off) is decoded which will signal to the system the occurrence of a false reading so that the system may suitably react, e.g. by repeating the start-up routine.

After the second reading confirms correctness the start-up routine is practically terminated and the motor may be accelerated and controlled by any suitable technique.

Of course, the initial rest position of the rotor as referred to the predefined phase of first excitation may be such that the rotor will not undergo any acceleration during the pre-established period of time T0 of the first excitation. In such a case, notwithstanding the first reading of the output configuration of the comparators after elapsing the time T0, no "zero-crossing" event will be detected within a certain pre-established delay. Such a missed detection of a "zero-crossing" event will automatically determine the repetition of the start-up routine by exciting a phase different from the predefined phase and which is functionally shifted by two phase-intervals from the predefined phase.

Preferably, the instant of interruption of the first excitation of the predefined phase for a preset time T0 is masked for a period of time of a fraction of T0, e.g. $\frac{1}{3}$ T0, in order to wait for a substantial decay of transients, before effecting the reading of the back electromotive forces.

Figure 8:
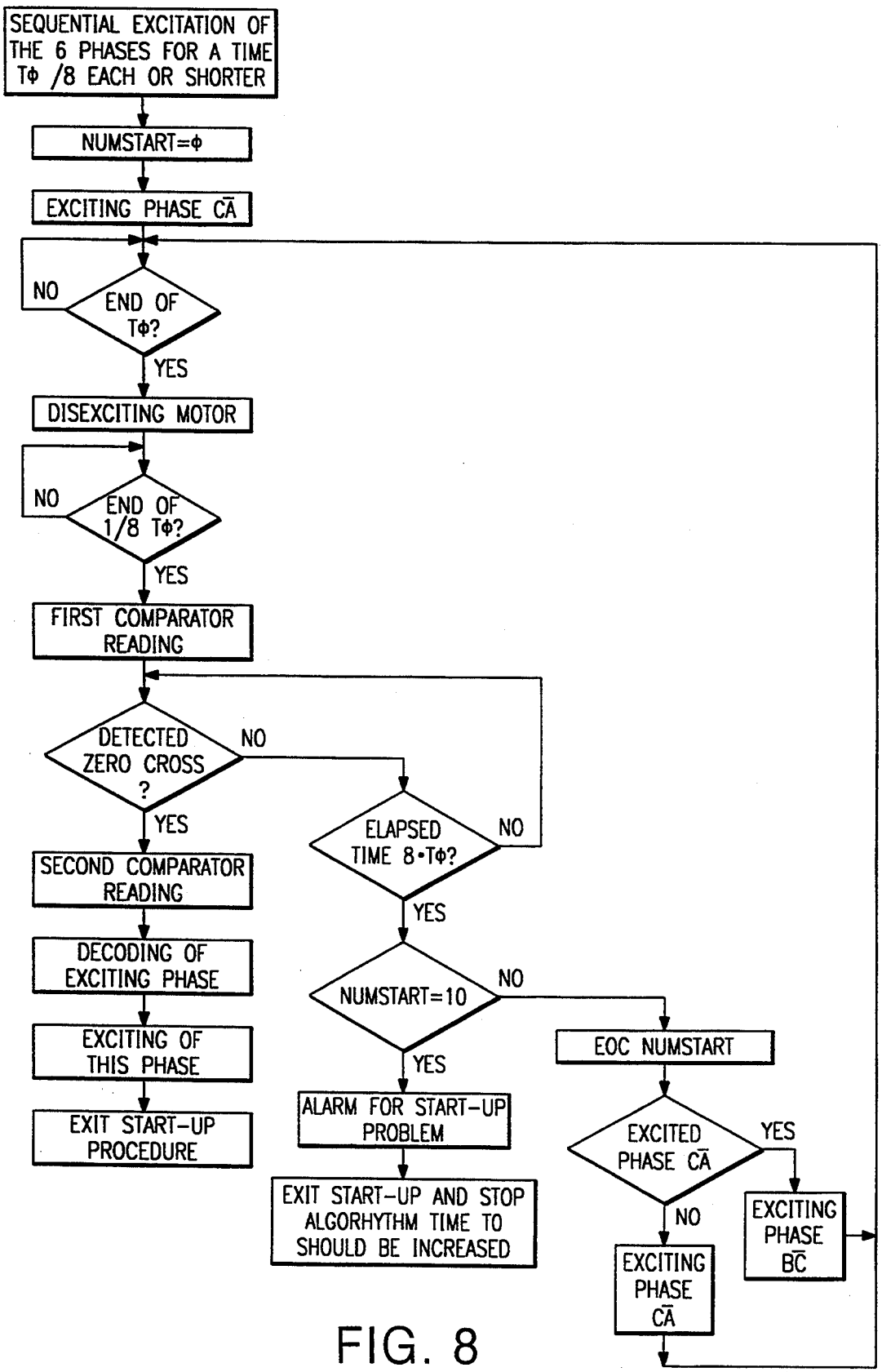
FIG. 8 is a flow diagram of the start-up routine of the present invention.

The procedure is illustrated in more detail in the flow chart of FIG. 8.

It is evident that in case the initial rest position of the rotor in respect to the predefined phase of first excitation is such as to determine the movement of the rotor toward a relative equilibrium position in a backward sense of rotation, the decoding of the optimal phase of excitation for starting-up in a forward direction the motor and the excitation of a so identified phase will produce an immediate braking action of the inertial backward movement of the rotor and an acceleration in the desired forward sense of rotation. In practice this prevents a possible backward rotation of the rotor from progressing beyond an angular distance equivalent to less than the angular distance of separation between two successive equilibrium positions of the rotor. In practice, this means ensuring a possible maximum backward rotation of just few degrees (e.g. <10°).

DESCRIPTION OF THE BEST MODE

The different possible situation at start-up and the relative behavior of the motor in performing the start-up routine object of the present invention will now be examined in detail, by referring to the relative figures.

Start-up of the Rotor from an Equilibrium Position Relative to Phase C!B

Figure 9:
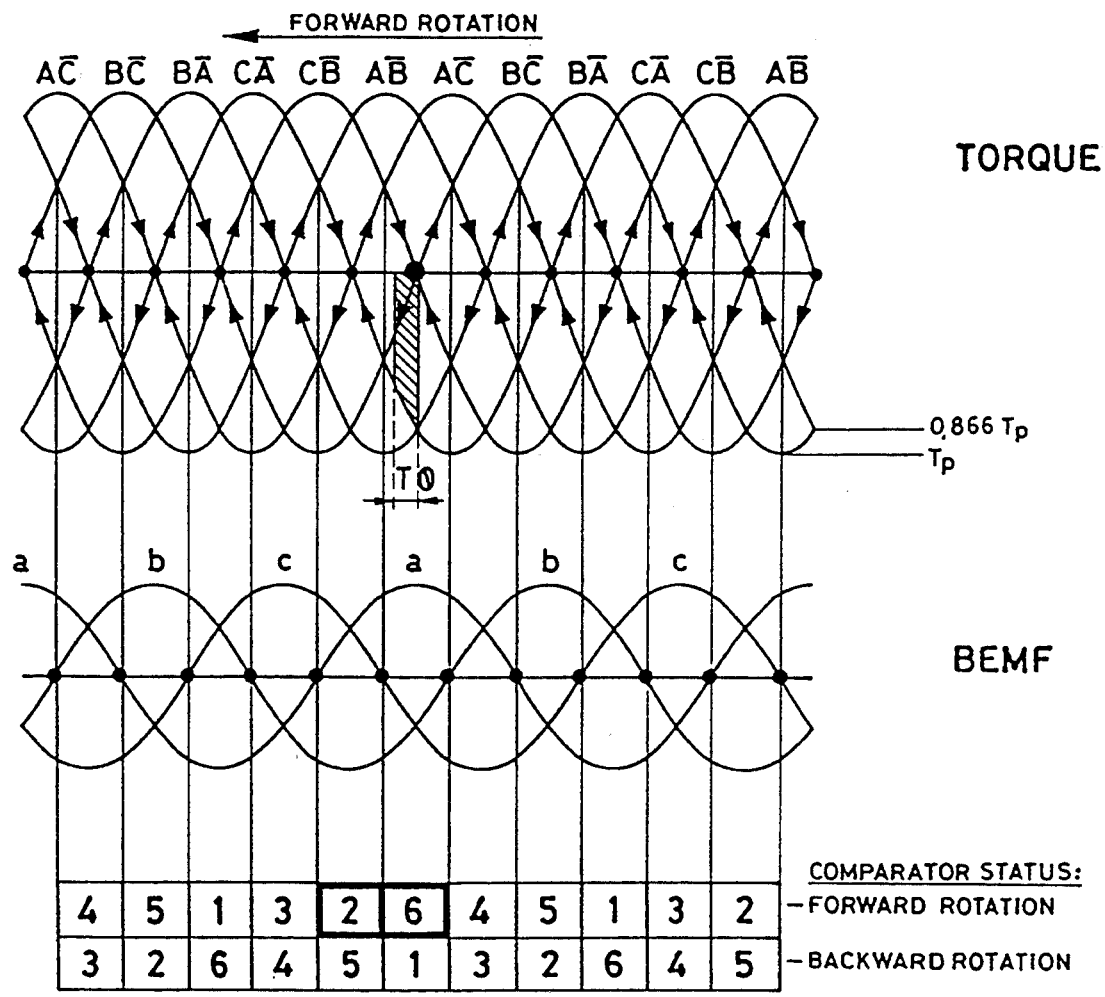
FIGS. 9, 10, 11, 12, 13, 14 and 15 show how the start-up routine of the invention is implemented in the different possible situations that may occur.

With reference to FIG. 9, the rotor is supposed to be in an initial, rest position corresponding to an equilibrium point relative to the phase C!B. By exciting the C!A phase for a period of time T0, the rotor is subjected to an impulse of torque given by the shaded area and the rotor is accelerated in a forward direction of rotation. Once the time T0 has elapsed, the excitation is interrupted and, after a sufficiently long masking time (e.g. Tmask=$\frac{1}{3}$*T0), the output configuration of the comparators is read and the data which is obtained has value 6, as shown in the table at the bottom of the diagrams.

After this first reading, with an inertial progression of the rotor rotation, a first "zero-crossing" of the signal representative of the BEMF across the C winding will be detected. After the occurrence of this first "zero-crossing" event, the output configuration of the comparators is read again and gives a value 2. Therefore the complete address is 6-2, wherein 6 decodes the row and 2 decodes the column of the "look-up table". The decoded address makes a phase pointer to point the phase B!C as the phase to be excited first in order to accelerate the motor in the desired sense of rotation (forward rotation).

In the case described above, the motor is started in a forward direction of rotation without undergoing any backward rotation.

Start-up of the Rotor from an Equilibrium Position Relative to Phase A!B

Figure 10:
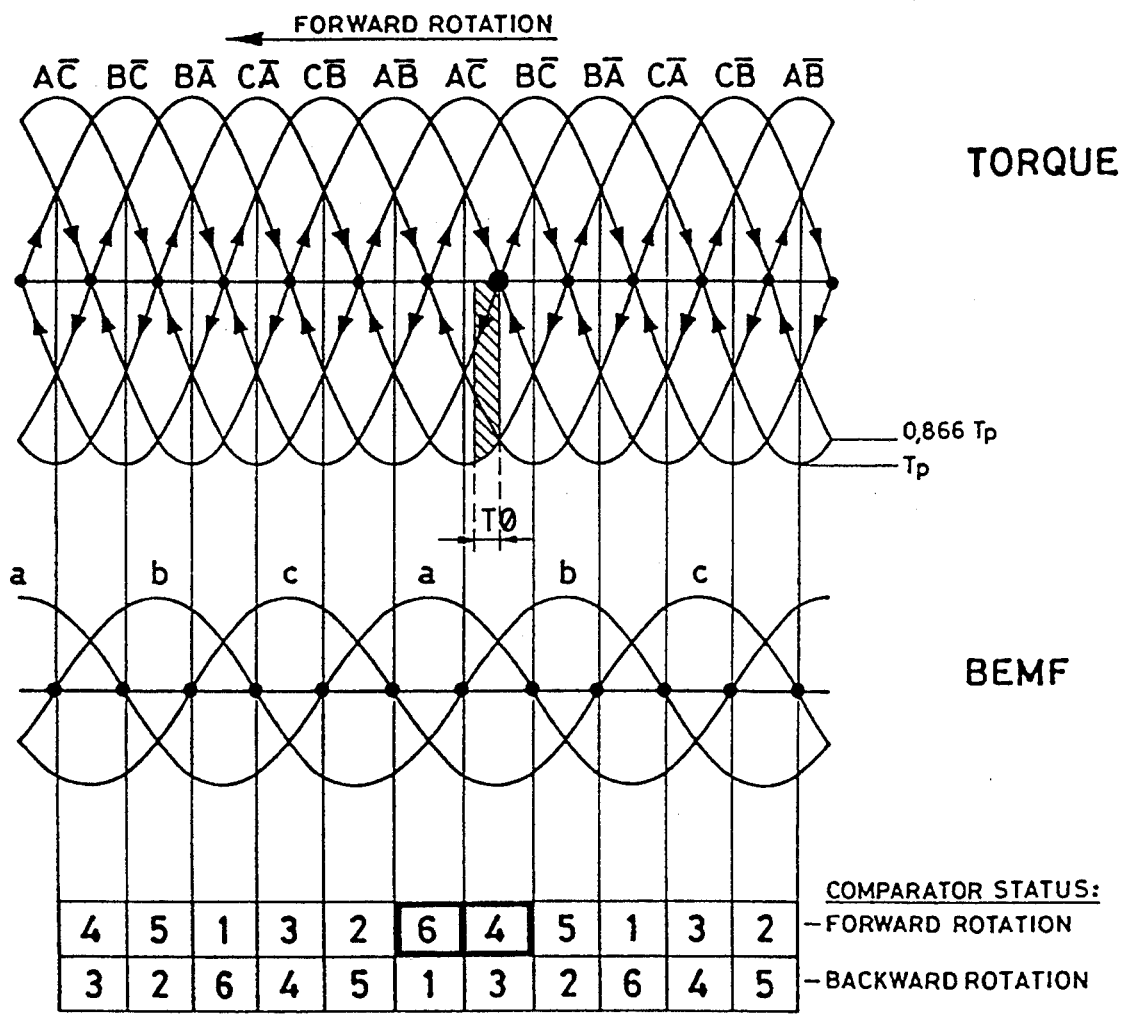

With reference to FIG. 10, the rotor is supposed to be in an initial, rest position corresponding to an equilibrium point relative to the phase A!B. By exciting the C!A phase for a period of time T0, the rotor is subjected to an impulse of torque given by the shaded area and the rotor is accelerated in a forward direction of rotation. Once the time T0 has elapsed, the excitation is interrupted and, after a sufficiently long masking time (e.g. Tmask=⅓*T0), the output configuration of the comparators is read and the data which is obtained has value 4, as shown in the table at the bottom of the diagrams.

After this first reading, with an inertial progression of the rotor rotation, a first "zero-crossing" of the signal representative of the BEMF across the B winding will be detected. After the occurrence of this event, the output configuration of the comparators is read again and gives a value 6. Therefore the complete address is 4-6, wherein 4 decodes the row and 6 decodes the column of the "look-up table". The decoded address makes a phase-pointer to point the phase B!A as the phase to be excited first in order to accelerate the motor in the desired sense of rotation (forward). Also in the case described above, the motor is started in a forward direction of rotation without undergoing any backward rotation.

Start-up of the Rotor from an Equilibrium Position Relative to Phase C!A

In view of the fact the rotor is at rest in an equilibrium point relative to the predefined phase of first excitation itself, it would not receive any acceleration because the applied impulse of torque will be null. This particular situation will be eventually recognized by the system by a decrement to zero of a counter loaded with a value equal to a multiple number of T0 intervals of time, e.g. 8*T0.

If no "zero-crossing" event in any one of the (BEMF) induced in the motor windings is detected before the decrement to zero of the above-mentioned counter, a different phase of the motor is excited for the same preset period of time T0. If the predefined phase of first excitation is C!A, the new phase to be excited in order to repeat the routine will be a phase shifted by two phase-intervals from the preset phase, i.e. the B!C phase.

Figure 11:
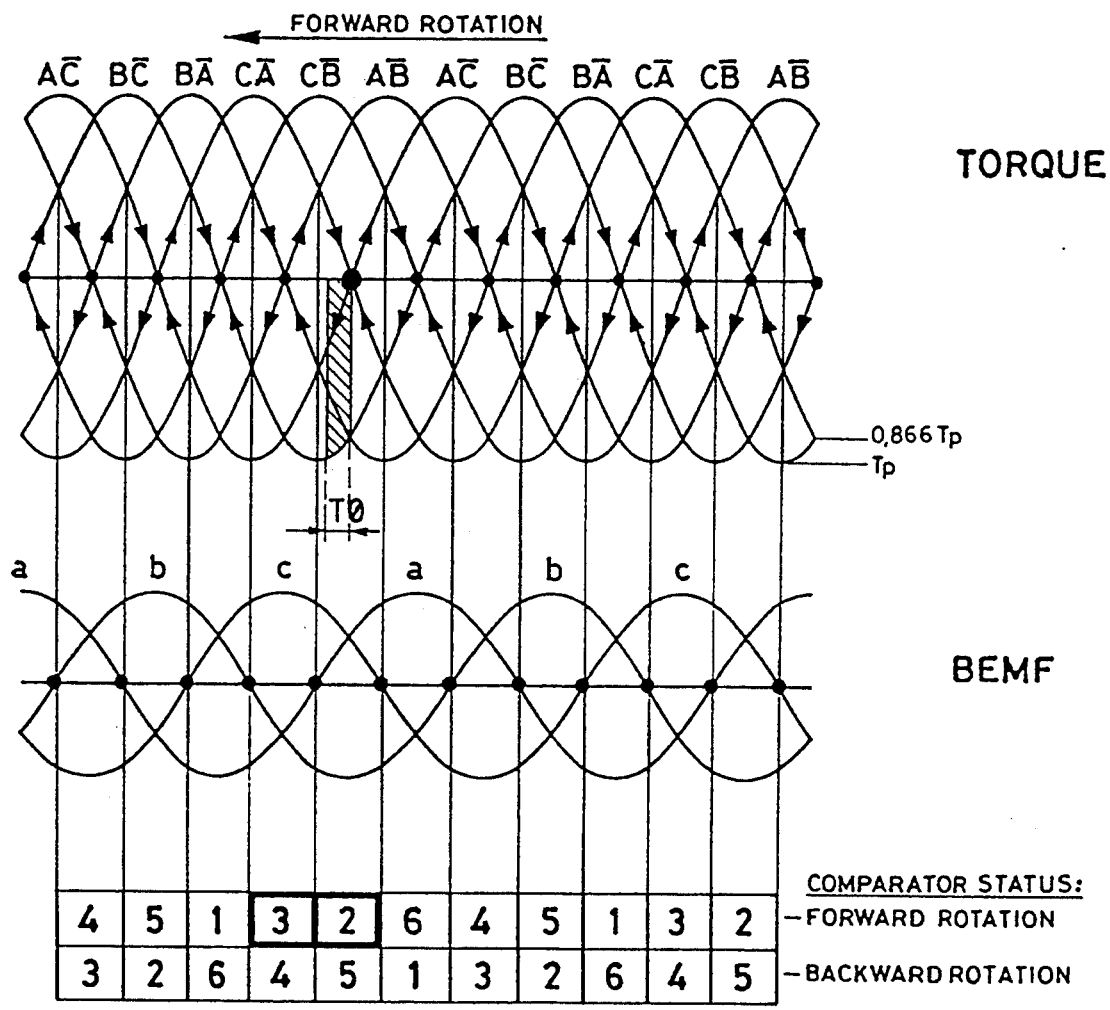

With reference to FIG. 11, the rotor is supposed to be in an initial, rest position corresponding to an equilibrium point relative to the phase C!A. By exciting the B!C phase for a period of time T0, the rotor is subjected to an impulse of torque given by the shaded area and the rotor is accelerated in a forward direction of rotation. Once the time T0 has elapsed, the excitation is interrupted and, after a sufficiently long masking time (e.g. Tmask=⅓*T0), the output configuration of the comparators is read and the data which is obtained has value 2, as shown in the table at the bottom of the diagrams.

After this first reading, with an inertial progression of the rotor rotation, a first "zero-crossing" of the signal representative of the BEMF across the A winding will be detected. After the occurrence of this event, the output configuration of the comparators is read again and gives a value 3. Therefore the complete address is 2-3, wherein 2 decodes the row and 3 decodes the column of the "look-up table". The decoded address makes a phase-pointer to point the phase A!C as the phase to be excited first in order to accelerate the motor in the desired sense of rotation (forward). Also in the case described above, the motor is started in a forward direction of rotation without undergoing any backward rotation.

What follows now is the description of three cases where a first excitation step of the predefined phase for a time T0 produces a backward acceleration of the rotor.

Start-up of the Rotor from an Equilibrium Position Relative to Phase B!C

Figure 12:
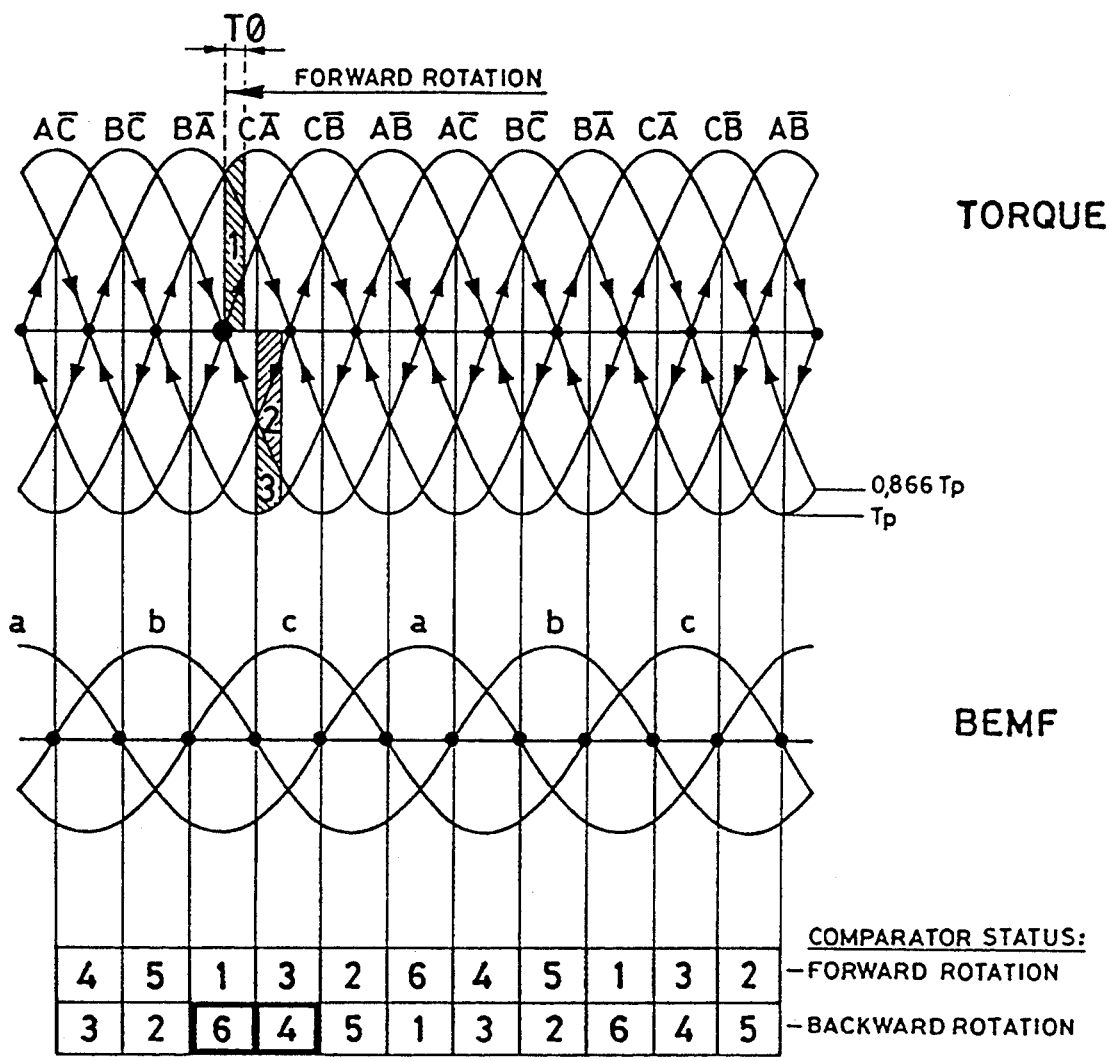

With reference to FIG. 12, the rotor is initially at rest in an equilibrium position relative to the B!C phase. By exciting the predefined phase C!A for a time T0, the rotor receives an impulse of torque given by the shaded area indicated with 1 of the diagram which causes an acceleration of the rotor in a backward sense of rotation.

At the end of the T0 period, the excitation is interrupted and, after the usual masking time Tmask (e.g. Tmask=⅓*T0) the output configuration of the comparators is read and gives the value 6. After the system has detected a first "zero-crossing" event in the BEMF induced on the B winding of the motor, the new output configuration of the comparators is read and gives the value 4.

Therefore the complete address is 6-4, wherein 6 decodes the row and 4 decodes the column of the "look-up table". The decoded address makes the phase-pointer to point the B!C phase, as the phase to be excited first. By observing FIG. 12, it may be easily seen that by having recognized a 6 to 4 transition in the output configuration of the comparators and, as a consequence, having excited the relative B!C phase, the impulse of torque which is imparted on the rotor and which is put in evidence by the shaded area identified with 2 in the diagram, has the effect of immediately stopping the back rotation of the rotor when a first portion of the shaded area 2 under the torque curve equals the area 1 and of inverting the sense of rotation of the rotor to a forward direction, in view of the fact that the area 2 is always greater than the area 1. Therefore the motor stops and changes direction.

Upon the change of direction of rotation of the rotor, the relative back electromotive forces (BEMFs) also switch polarity. This represents a "pseudo-zero-crossing" event, which in practice is interpreted as such by the system and, as a consequence, the system determines the excitation of a next optimal phase which is the A!C phase. In this manner, the motor accelerates in the desired forward direction of rotation under the new impulse of torque which is represented by the shaded area, identified with 3 in the diagram of FIG. 12.

The routine may be described as follows:
a) exciting the C!A phase, thus producing an impulse of torque given by the area 1;
b) detecting the occurrence of a first "zero-crossing" event;
c) decoding, by using the data read off the comparators before and after the detected "zero-crossing" event, the phase which will exert the maximum braking torque and exciting said phase B!C;

d) when the area 2 of the impulse of braking torque equals the area 1, the rotor will come to a stop and change direction of rotation thus causing an inversion of sign of the induced BEMFs which in turn is interpreted by the system as a new "zero-crossing" event;

e) accelerating the motor thus started in a forward rotation by exciting a newly decoded phase.

Start-up of the Rotor from an Equilibrium Position Relative Phase B!A

Figure 13:
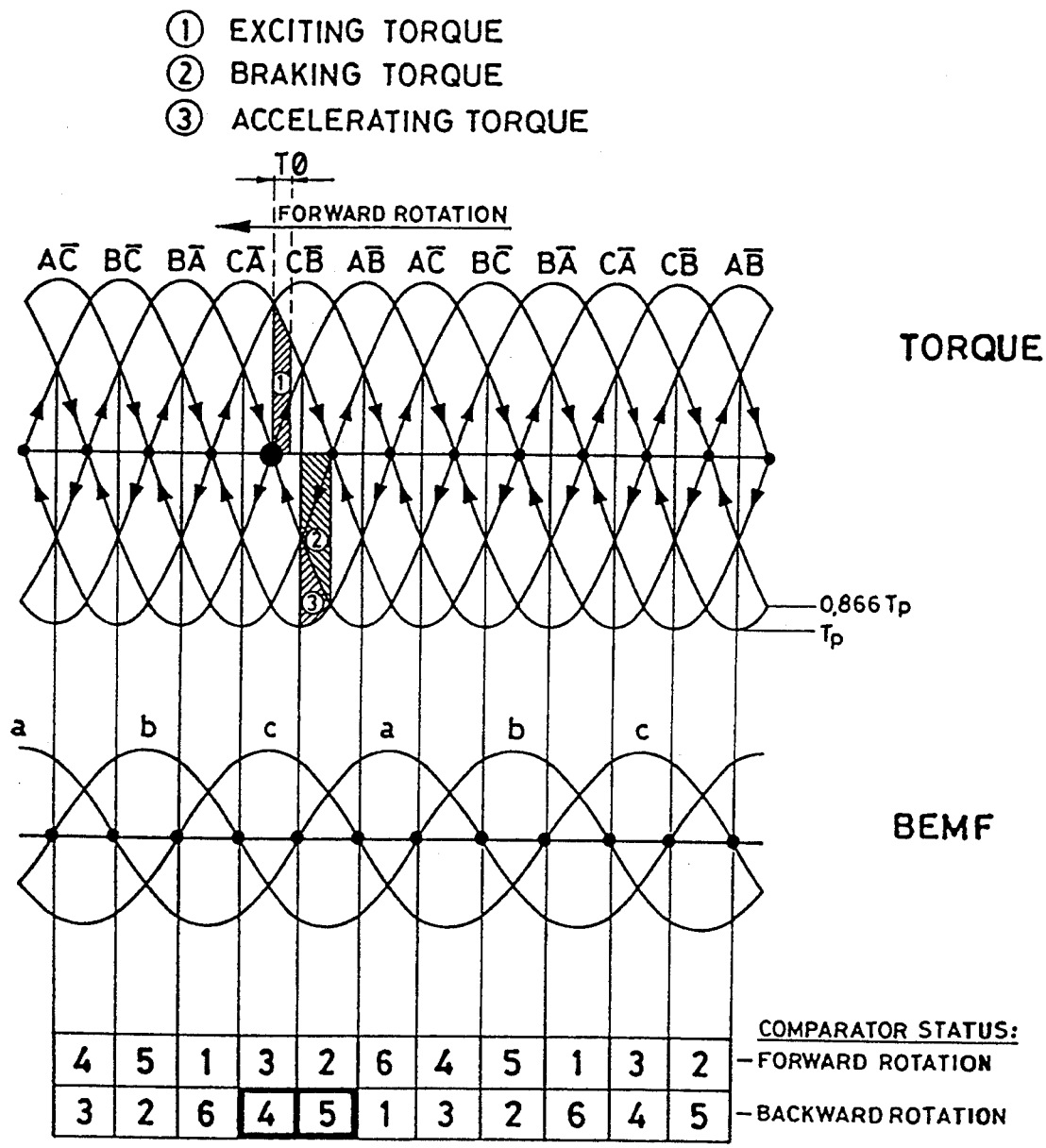

With reference to FIG. 13, the rotor is initially at rest in an equilibrium position relative to the B!A phase. By exciting the predefined phase C!A for a time T0, the rotor receives an impulse of torque given by the shaded area indicated with 1 of the diagram which causes an acceleration of the rotor in a backward sense of rotation.

At the end of the T0 period, the excitation is interrupted and, after the usual masking time Tmask, (e.g. Tmask=⅓*T0) the output configuration of the comparators is read and gives the value 4. After the system has detected a first "zero-crossing" event in the BEMF induced on the A winding of the motor, the new output configuration of the comparators is read and gives the value 5.

Therefore the complete address is 4-5, wherein 4 decodes the row and 5 decodes the column of the "look-up". The decoded address makes the phase-pointer to point the B!A phase, as the phase to be excited first. By observing FIG. 13, it may be easily seen that by having recognized a 4 to 5 transition in the output configuration of the comparators and, as a consequence, having excited the relative B!A phase, the impulse of torque which is imparted on the rotor and which is put in evidence by the shaded area identified with 2 in the diagram, has the effect of immediately stopping the back rotation of the rotor when a first portion of the shaded area 2 under the torque curve equals the area 1 and of inverting the sense of rotation of the rotor to a forward direction, in view of the fact that the area 2 is always greater than the area 1. Therefore the motor stops and changes direction.

Upon the change of direction of rotation of the rotor, the relative back electromotive forces (BEMF) also switch polarity. This represents a "pseudo-zero-crossing" event, which in practice is read as such by the system and, as a consequence, the system determines the excitation of a next optimal phase which is the B!C phase. In this manner, the motor accelerates in the desired forward direction of rotation under the new impulse of torque which is represented by the shaded area, identified with 3 in the diagram of FIG. 13. The routine may be described as follows:

a) exciting the C!A phase, thus producing an impulse of torque given by the area 1;

b) detecting the occurrence of a first "zero-crossing" event;

c) decoding by using the data read off the comparators before and after the detected "zero-crossing" event the phase which will exert the maximum braking torque and exciting said phase B!A;

d) when the area 2 of the impulse of braking torque equals the area 1, the rotor will come to a stop and change direction of rotation thus causing an inversion of sign of the induced BEMFs which in turn is interpreted by the system as a new "zero-crossing" event;

e) accelerating the motor thus started in a forward rotation by exciting a newly decoded phase.

Start-up of the Rotor from an Equilibrium Position Relative to Phase A!C

In view of the fact the rotor is at rest in an equilibrium point relative to the predefined phase of first excitation, it would not receive any acceleration because the applied impulse of torque will be null. This particular situation will be eventually recognized by the system by a decrement to zero of a counter loaded with a value equal to a multiple number of T0 intervals of time, e.g. 8*T0.

If no "zero-crossing" event in any one of the (BEMF) induced in the motor windings is detected before the decrement to zero of the above-mentioned counter, a different phase of the motor is excited for the same preset period of time T0. If the predefined phase of first excitation is C!A, the new phase to be excited in order to repeat the routine will be a phase shifted by two phase-intervals from the preset phase, i.e. the B!C phase.

Figure 14:
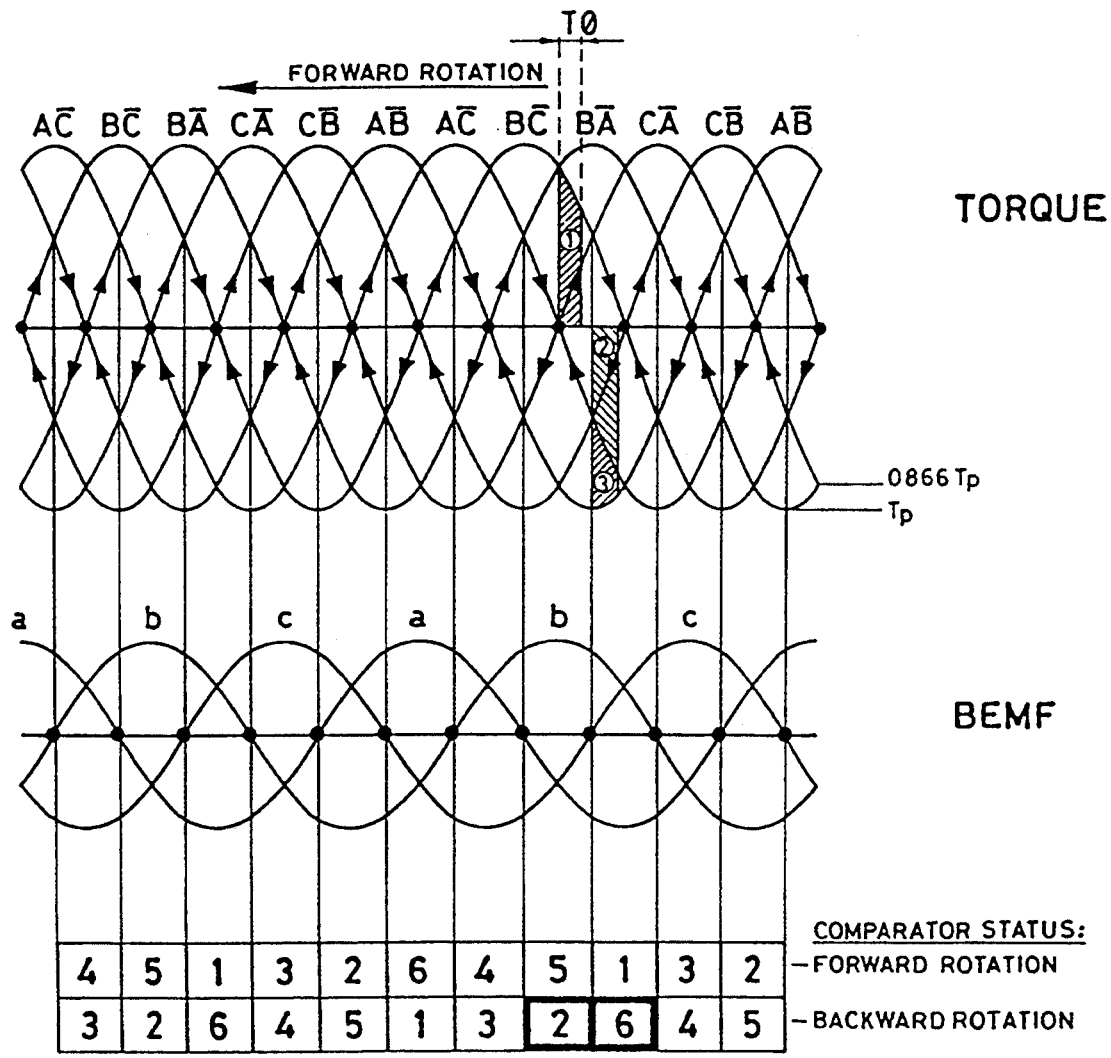

With reference to FIG. 14, the rotor is supposed to be in an initial, rest position corresponding to an equilibrium point relative to the phase A!C. By exciting the B!C phase for a period of time T0, the rotor is subjected to an impulse of torque given by the shaded area and the rotor is accelerated in a forward direction of rotation. Once the time T0 has elapsed, the excitation is interrupted and, after a sufficiently long masking time (e.g. Tmask=⅓*T0), the output configuration of the comparators is read and the data which is obtained has value 2, as shown in the table at the bottom of the diagrams.

After this first reading, with an inertial progression of the rotor rotation, a first "zero-crossing" of the signal representative of the BEMF across the C winding will be detected. After the occurrence of this event, the output configuration of the comparators is read again and gives a value 6. Therefore the complete address is 2-6, wherein 2 decodes the row and 6 decodes the column of the "look-up table". The decoded address makes a phase-pointer to point the phase A!C as the phase to be excited first.

By observing FIG. 14, it may be easily seen that by having recognized a 2 to 6 transition in the output configuration of the comparators and, as a consequence, having excited the relative A!C phase, the impulse of torque which is imparted on the rotor and which is put in evidence by the shaded area identified with 2 in the diagram, has the effect of immediately stopping the back rotation of the rotor when a first portion of the shaded area 2 under the torque curve equals the area 1 and of inverting the sense of rotation of the rotor to a forward direction, in view of the fact that the area 2 is always greater than the area 1. Therefore the motor stops and changes direction.

Upon the change of direction of rotation of the rotor, the relative back electromotive forces (BEMF) also switch polarity. This represents a "pseudo-zero-crossing" event, which in practice is read as such by the system and, as a consequence, the system determines the excitation of a next optimal phase which is the A!B phase. In this manner, the motor accelerates in the desired forward direction of rotation under the new impulse of torque which is represented by the shaded area, identified with 3 in the diagram of FIG. 14. The routine may be described as follows:

a) exciting the B!C phase, thus producing an impulse of torque given by the area 1;

b) detecting the occurrence of a first "zero-crossing" event;

c) decoding by using the data read off the comparators before and after the detected "zero-crossing" event the phase which will exert the maximum braking torque and exciting said phase A!C;

d) when the area 2 of the impulse of braking torque equals the area 1, the rotor will come to a stop and change direction of rotation thus causing an inversion of sign of the induced BEMFs which in turn is interpreted by the system as a new "zero-crossing" event;

e) accelerating the motor thus started in a forward rotation by exciting a newly decoded phase.

Figure 15:
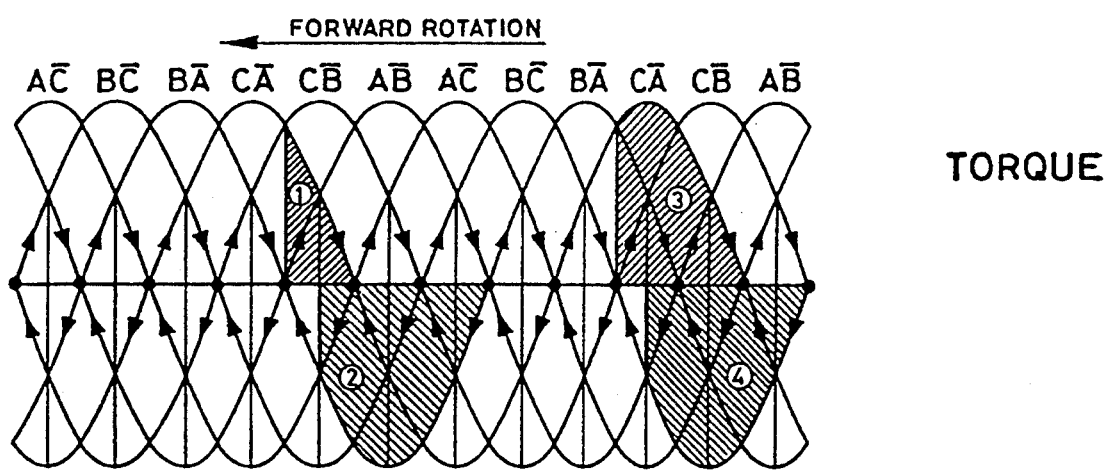

For better understanding the validity of the process of the invention for the start-up situations of the last three examples, it may be useful to further emphasize the important aspect represented by the fact that by starting from any equilibrium position of the rotor, the maximum impulse of torque which may be exerted in a forward direction of rotation is consistently always greater of the maximum impulse of torque which may be theoretically exerted in a backward sense of rotation. Therefore an advantageous condition exists for immediately exerting a large impulse of braking torque in those cases where the momentary initial excitation of the predefined phase of the start-up routine actually starts the motor in a backward rotation. This fact is put in evidence in FIG. 15, wherein it is clearly shown that the shaded areas 1 and 3 are always smaller than the shaded areas 2 and 4, respectively.

Figure 16:
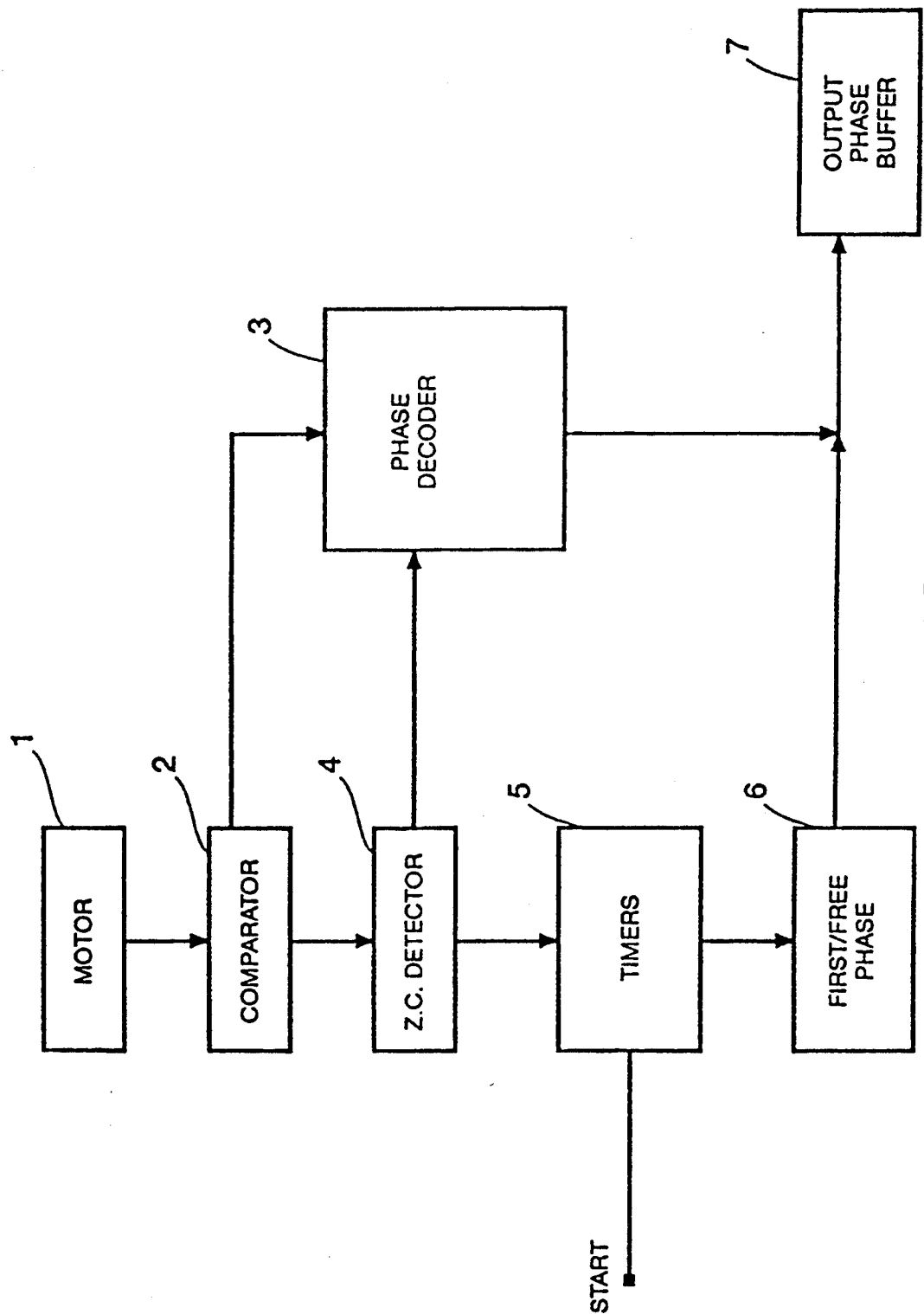
FIG. 16 is a block diagram of an embodiment of a start-up system of the invention.

As schematically illustrated in FIG. 16, the systems comprises a block of comparators 2 capable of assuming an output configuration which represents the signs of the back electromotive forces induced in the respective phase-windings of the motor 1. The digital data derived from reading the output configuration of the comparator 2 are sent to a decoding circuitry 3 which, by the use of a "look-up table" is capable of providing an address code which identifies the optimum phase to be excited in order to start-up the motor in the desired direction (forward rotation). The circuitry of the block 4, to which the output signals of the comparators of the block 2 are sent, detects the occurrence of a "zero-crossing" event in the waveforms of the induced BEMFs and consequently generates a control signal which is sent to the decoding block 3, which will process the new digital datum representing the output configuration of the set of comparators (block 2) subsequent to the detected "zero-crossing" event. The block 5, which may be initialized by a start signal, contains the timers which control the correct sequence of steps to be performed in accordance with the algorithm of the start-up process, which, upon the recognition of the optimum phase to be excited by the decoding block 3 and upon a confirmation of the correctness of execution of the routine provided by the block 6, starts-up the motor through the block 7 which determines the correct sequence of excitation beginning from the decoded optimal starting phase.

Figure 17:
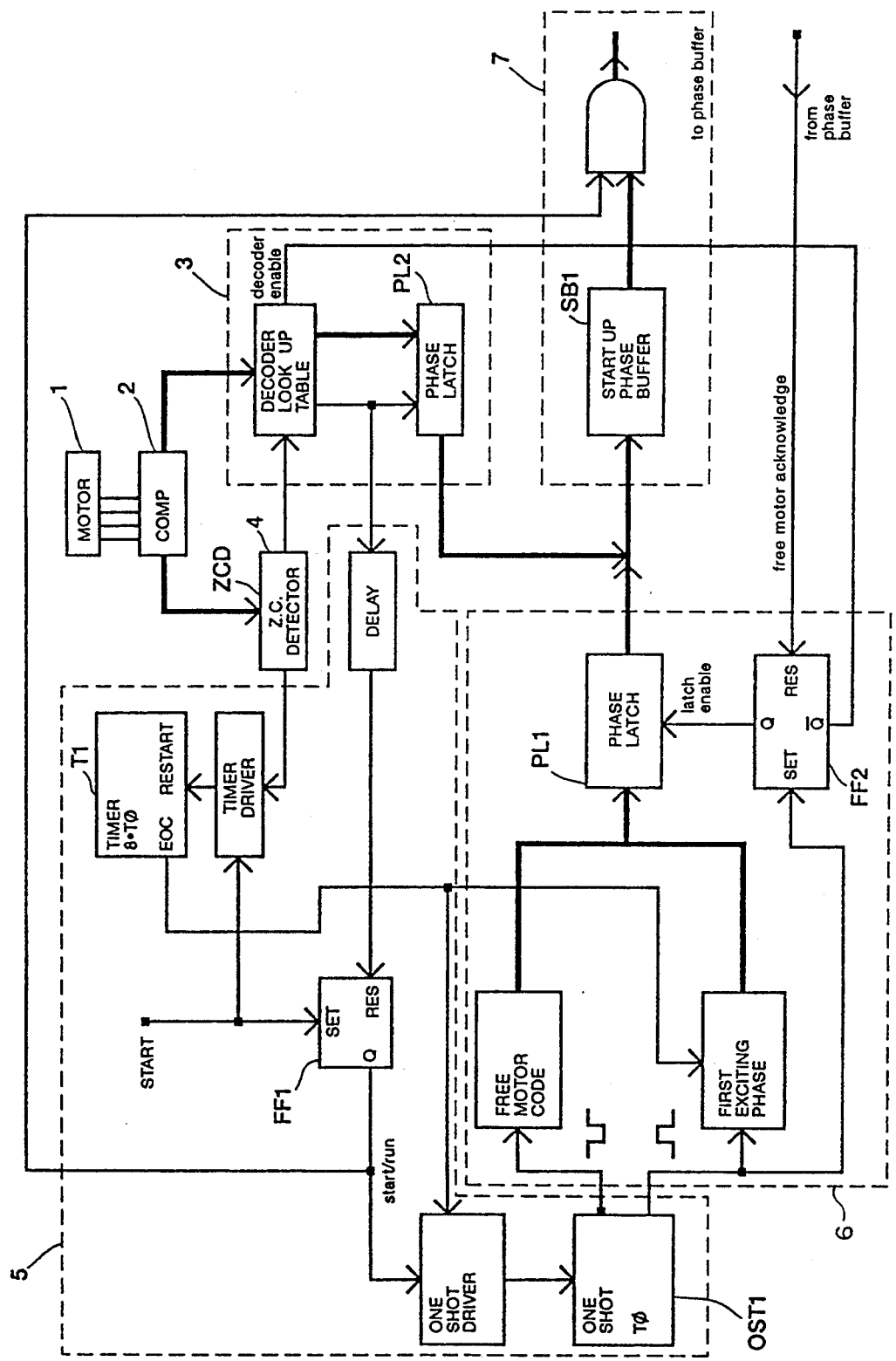
FIG. 17 is a more detailed block diagram of the start-up system FIG. 16.

FIG. 17 is a more detailed block diagram of an embodiment of the system of the invention, as depicted in the preceding FIG. 16. The principal blocks described in FIG. 16 are identified in FIG. 17 by the respective boundaries traced with a dash-line. When a start signal is received, the flip-flop FF1 is set and therefore the start-run signal is placed to a logic "1". This signal enables the phase-buffer block PB to receive the data which decode the phase to be excited by the start-up buffer block SB1 and, at the same time, starts the one-shot timer OST1, which is suitably loaded in order that its output remains at a high logic level for a time T0.

The rising front of the signal which is produced on the output of the OST1 block, enables the loading of the code of the first phase to be excited in the phase-latch PL1 and enables the same through the flip-flop FF2.

The falling front of the pulse loads the code which stops the excitation of the motor in the phase-latch PL1.

When such a code is recognized by the phase-buffer (PB), the latter delays by a fractionary interval of time (e.g. T0/8) the resetting of the flip-flop FF2 which then enables the phase-decoder PD, which effects the first reading.

At this point a "zero-crossing" event is waited for and the following alternative conditions of operation may occur.

1) a "zero-crossing" event is detected before the running out of the 8×T0 interval stored in timer T1. In this case the "zero-cross" detector ZCD enables the decoder PD to effect a second reading. After having performed a second reading, the decoder PD enables the phase-latch PL2 and transfers the code of the optimal phase which is in turn transferred to the start-up phase-buffer SP1. The flip-flop FF1 is thereafter reset and therefore the start-run signal, by becoming low, disables the start-up routine. 2) a "zero crossing" event is not detected before the running out of the timer T1.

In this case, the "end-of-count" (EOC) of the timer (T1) sets to zero the timer itself, resets OST1 and excites as a new, first excitation phase a phase which is functionally shifted angularly by two phases as referred to the previous, first-excitation phase the routine is repeated.

Sample Specific Implementation

For clarity, the accompanying Figures depict some details of a sample specific implementation. However, of course, this specific implementation, and its specific details, are not be any means necessary for practicing the claimed invention.

Figure 18:
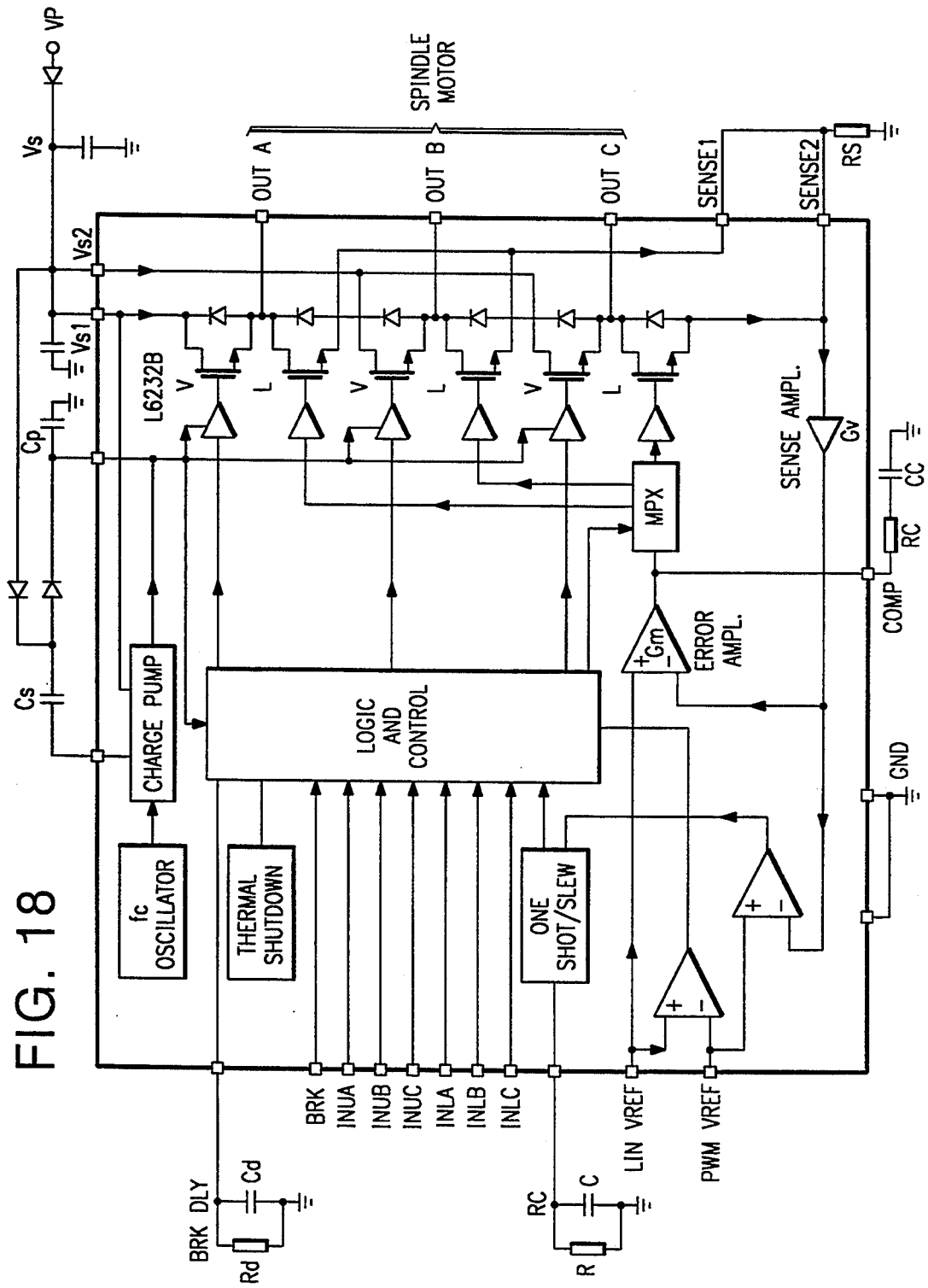
FIG. 18 shows greater detail of the connection of output phase buffer 7 to the switching transistors which actually source or sink current to the motor, in a sample preferred embodiment.

FIG. 18 shows greater detail of the connection of output phase buffer 7 to the switching transistors which actually source or sink current to the motor, in a sample preferred embodiment.

Figure 19:
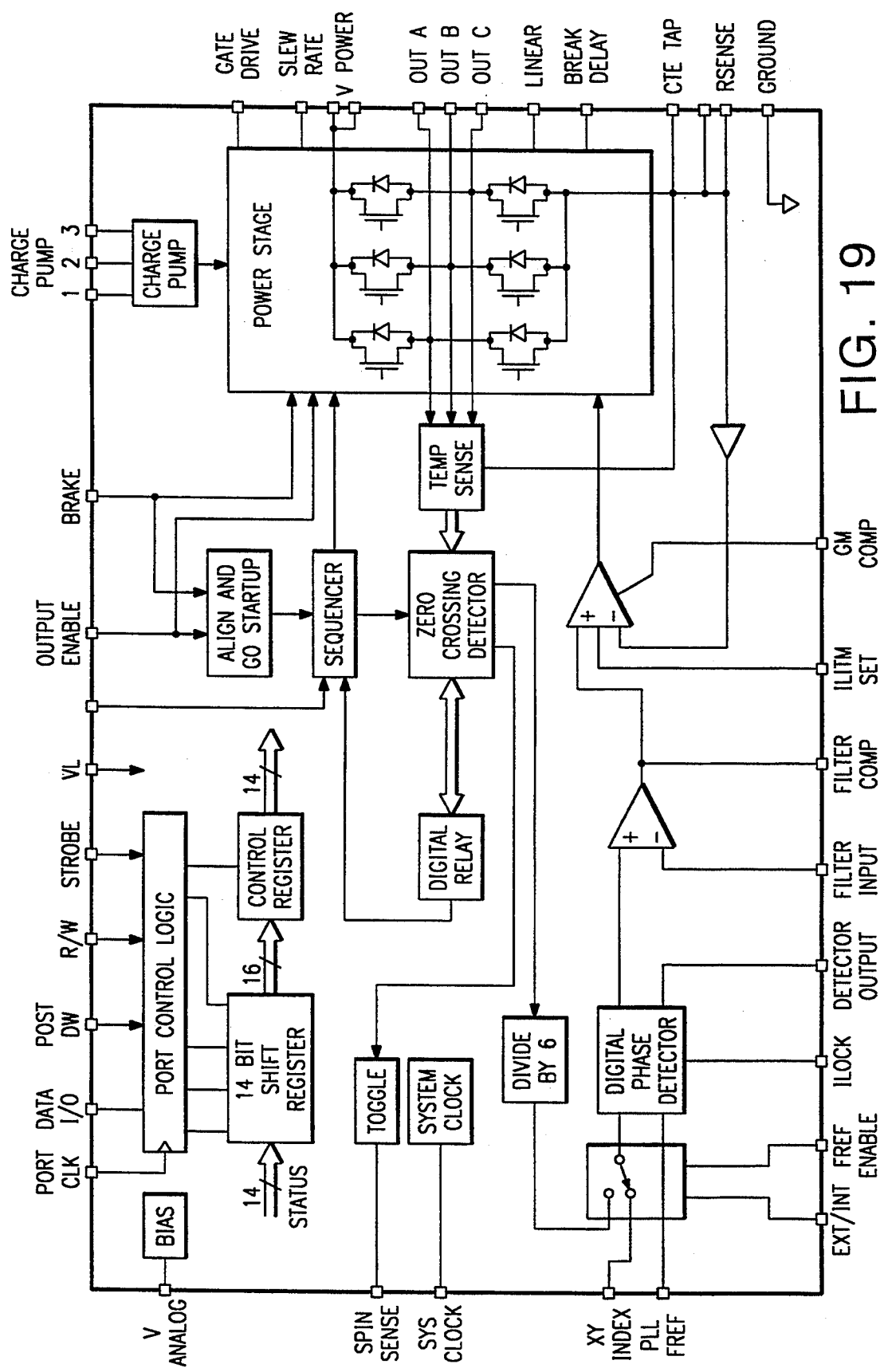
FIG. 19 shows a sample embodiment of the innovative motor control system on an integrated circuit.

FIG. 19 shows a sample embodiment of the innovative motor control system on an integrated circuit.

Figure 20:
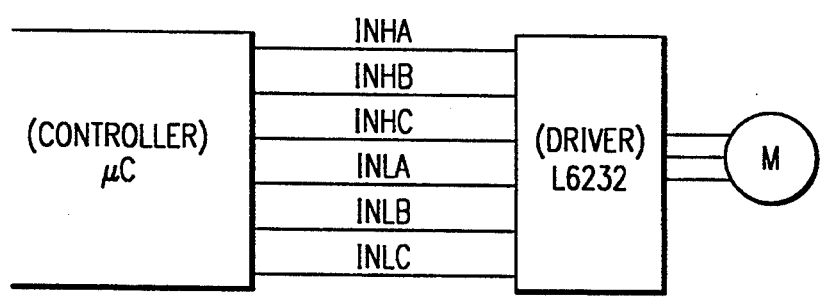
FIG. 20 shows a sample embodiment of a innovative motor control system, including a microcontroller in combination with an array of driver devices. (In a sample embodiment, the driver devices are provided by an L6232 part from SGS-Thomson.)

FIG. 20 shows a sample embodiment of a innovative motor control system, including a microcontroller in combination with an array of driver devices. (In a sample embodiment, the driver devices are provided by an L6232 part from SGS-Thomson.) By driving the inputs INHA, INHB, INHC, INLA, INLB and INLC, the power MOS are switched on and off according to the following table:

| INHA | INHB | INHC | INLA | INLB | INLC | EXCITED PHASE |
|------|------|------|------|------|------|---------------|
| 0    | 1    | 1    | 0    | 1    | 0    | AB            |
| 0    | 1    | 1    | 0    | 0    | 1    | AC            |
| 1    | 0    | 1    | 0    | 0    | 1    | BC            |
| 1    | 0    | 1    | 1    | 0    | 0    | BA            |
| 1    | 1    | 0    | 1    | 0    | 0    | CA            |
| 1    | 1    | 0    | 0    | 1    | 0    | CB            |

With reference to the circuit diagram of FIG. 18, what the microcontroller or the wired logic circuitry must do is to switch the logic state in an intelligent manner (i.e. at the correct instant) of the signals that are fed to the inputs: INHA, B, C and INLA, B, C.

FIG. 18 shows greater detail of the connection of output phase buffer 7 to the switching transistors which actually source or sink current to the motor, in a sample preferred embodiment.

FIG. 19 is a block diagram which shows a sample implementation of the invention in a L6238 chip. This chip implements a so-called "alignment-and-go" start-up procedure. A contemplated advantageous embodiment is to retain the existing structure of the chip and substitute the logic circuit embodying the start-up procedure (indicated by the arrow in the chip's diagram) with the circuit of the present invention to implement the improved start-up procedure.

The first time interval of excitation must necessarily be long enough to move a rotor from the rest position, but this first time interval should preferably conclude before a first zero-cross event occurs. Indeed, this is the only parameter that needs to be adjusted in dependence on the actual characteristics of the motor.

Depending on the definition of the this first time interval, it may occur that the first zero-crossing event cannot be read. In this case the motor would nevertheless start-up upon the occurrence of a second zero-crossing event; however the resulting back-rotation (when present), would be incremented by a quantity equal to the angle between two successive zero-cross positions.

In a sample demonstrated embodiment, the described innovations have been tested with different motors. For example, with a NIDEL 5 V motor having a Kt value of 8.2 mV/(rad/sec), a time T0 of 20 msec was used, with a starting current $I_{start}$ of 0.5 A.

Other tested motors were contained in hard disk assemblies of various manufacturers: among them a 2.5" hard disk of Western Digital, having the following characteristics:

$V_{alim}$=5 V;
Kt=5.55 mV/(rad/sec);
T0=20 msec;
$I_{start}$ 0.5 A.

Other motors were assembled in VCR drives (Philips, Thomson, Panasonic). Only the excitation time T0=20 m sec, the supply voltage $V_{alim}$=12 V and the start current $I_{start}$=1A of these motors were known.

The Kt values of the motors that may be equipped with the controller of the invention are normally such as to produce BEMF signals of sufficient amplitude to permit detection of zero-cross events at start-up. Once the motor has been started-up and is running, the BEMFs are clamped by the input stage of the op-amps. Once the start-up procedure has successfully terminated, the control of the running motor is performed by a different circuit.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, the specific assignment of the separate comparator outputs to different bit positions is of no importance at all. These bits merely serve to identify a unique place in the lookup table, and the sequencing of entries in this table is unimportant.

For example, the preferred embodiment has been described in the specific context of a motor which has only three stator windings, and which uses a permanent-magnet rotor with only two poles. However, the disclosed innovations can also be adapted to motors which include more than three stator windings, or even to motors which include a quadrupole rotor.

For another example, it is not by any means necessary that the motor windings should be center-tapped as shown in FIG. 1. Although this is a common and useful arrangement, the invention could also be applied to a configuration where the two terminals of each winding were separately brought out. Such a configuration would presumably be less advantageous, but could still benefit from the disclosed innovations.

For another example, the disclosed innovations would be equally applicable to a multi-phase DC motor which used a higher number of physical windings per stator terminal than the presently preferred embodiment.

For another example, the disclosed innovations can also be implemented using a microcontroller (or other programmable logic) instead of the hard-wired logic implementation of the presently preferred embodiment.

The selection of switching transistors is merely dictated by the voltage and current requirements of the motor used. Although the disclosed innovations are particularly useful in small motors (where the extra cost of position sensing is a significant factor), these innovations can also advantageously be used in larger motors. The disclosed innovative control arrangement can be used in combination with a wide variety of switching devices, including bipolar or MOS transistors (alone or in combination with shunt diodes), thyristors, relays, etc.

Similarly, the particular connections used for analog sensing are not particularly critical. As will be obvious to those skilled in the art, the comparator inputs may be protected with series and/or shunt resistors and/or zener diodes, depending on the motor operating voltage and the expected exposure to transient voltages.

The foregoing description has focussed on the startup phase of motor control. However, of course, there are a vast number of circuits and methods for controlling DC motors, in response to changing load conditions and operator demands, which can be used in combination with the disclosed start-up procedures. These further control procedures can be used in combination with the disclosed innovative startup procedures, and may even be implemented (at least partly) in shared hardware components.

Of course, the first and second time durations can be modified for different motors, or at least for different classes of motors. Moreover, it is alternatively and less preferably possible to use more complex procedures to adaptively modify these parameters, in service, to provide the best fit of these parameters to the particular motor/load combination being driven.

For another example, the disclosed innovations would be equally applicable to a DC motor which used a slip-ring (not commutated) arrangement to feed a rotor coil, instead of a permanent-magnet rotor.

The disclosed circuitry would be particularly well suited to a "smart power" chip, which included the control logic shown together with the switching transistors to drive a small motor.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A method for starting-up a motor having multiple stator winding excitation phases separately excitable in a predetermined sequence corresponding to a forward direction of rotation of a rotor, comprising the steps of:
    (a.) providing current to said windings, for a first maximum time duration, to excite an initial phase thereof; wherein said first duration is sufficiently short that the rotor travels, during said first duration, through no more than one-half of the angular separation between two adjacent ones of the equilibrium positions, stable or unstable, of all of said phases;
    (b.) monitoring back electromotive force (back EMF) on multiple ones of said windings, and generating digital signals accordingly;
    (c.) IF a zero-crossing of back EMF occurs on any one of said windings within at most a second time duration, then using said digital signals to determine an optimal phase for excitation, and exciting said optimal phase; and
    (d.) if NO zero-crossing of back EMF occurs on any one of said windings within said second time duration, then repeating said step
        (a) with a different initial phase which is not adjacent to said first initial phase in said predetermined sequence of excitation phases;
    whereby said motor is started and operated without requiring sensor inputs to ascertain rotor position, and with minimal backward rotation at the time of startup.

2. The method of claim 1, further comprising the preliminary step, prior to said step (a), of rapidly exciting multiple ones of said excitation phases.

3. The method of claim 1, wherein said step of monitoring back EMF is performed by a plurality of differential amplifiers and hysteresis gates, each connected to a respective one of said windings.

4. The method of claim 1, wherein said step of monitoring back EMF is performed by a plurality of differential amplifiers and Schmitt triggers, each connected to a respective one of said windings.

5. The method of claim 1, further comprising the additional step, after said step (d), of: continuing to supply successive phases of said windings with current in said predetermined sequence, to maintain rotation of said motor.

6. The method of claim 1, wherein said step of using said digital signals to determine an optimal phase for excitation consists essentially of using said digital signals as address inputs to a lookup table.

7. A method for operating a motor having multiple stator windings and a rotor, comprising the steps of:
    (a.) providing current to said windings, for a first maximum time duration, to excite an initial phase thereof; wherein Said first duration is sufficiently short that the rotor travels, during said first duration, through no more than one-half of the angular separation between two adjacent ones of the equilibrium positions, stable or unstable, of all of said phases;
    (b.) monitoring back electromotive force (back EMF) on multiple ones of said windings, and generating digital signals accordingly;
    (c.) IF a zero-crossing of back EMF occurs on any one of said windings within at most a second time duration, and if the signs of said back EMF values after said zero-crossing are consistent with the signs of said back EMF values before said zero-crossing, then using said digital signals to determine an optimal phase for excitation, and exciting said optimal phase; and
    (d.) if NO zero-crossing of back EMF occurs on any one of said windings within said second time duration, then repeating said step
        (a) with a different initial phase which is not adjacent to said first initial phase in said predetermined sequence of excitation phases;
    whereby said motor is started and operated without requiring sensor inputs to ascertain rotor position, and with minimal backward rotation at the time of startup.

8. The method of claim 7, further comprising the preliminary step, prior to said step (a), of rapidly exciting multiple ones of said excitation phases.

9. The method of claim 7, wherein said step of monitoring back EMF is performed by a plurality of differential amplifiers and hysteresis gates, each connected to a respective one of said windings.

10. The method of claim 7, wherein said step of monitoring back EMF is performed by a plurality of differential amplifiers and Schmitt triggers, each connected to a respective one of said windings.

11. The method of claim 7, further comprising the additional step, after said step (d), of: continuing to supply successive phases of said windings with current in said predetermined sequence, to maintain rotation of said motor.

12. The method of claim 7, wherein said step of using said digital signals to determine an optimal phase for excitation consists essentially of using said digital signals as address inputs to a lookup table.

13. A method for starting-up a brushless and sensorless DC motor having multiple stator windings and a rotor, without causing significant backward rotation, which comprises the steps of:
    (a) temporarily exciting the windings, in a first initial phase thereof, for a first interval of time; wherein said first interval has a maximum duration which is sufficiently short that the rotor travels, during said first interval, through no more than one-half of the angular separation between two adjacent ones of the equilibrium positions, stable or unstable, of all of the phases of said windings;
    (b) after said excitation step (a), digitally reading the signs of respective back electromotive forces (back EMF)on multiple ones of the windings;
    (c) detecting the occurrence of a first zero-crossing event in any one of said induced back electromotive forces within a preset second interval of time after said first excitation step, and accordingly:
    if such a zero-crossing event occurs within said second interval, again digitally reading the signs of said induced back electromotive forces, and utilizing said readings for decoding an optimal phase for excitation;

if such occurrence is not detected before the elapsing of said second interval of time subsequent to the instant of interruption of said first excitation step, repeating said steps (b) and (c) with a second initial phase which is functionally shifted by at least two phase positions in respect to said first initial phase; and (d) starting-up the motor by sequentially exciting phases of said windings, initiating from said decoded optimal phase.

14. The method of claim 13, wherein said step of monitoring back EMF is performed by a plurality of differential amplifiers and hysteresis gates, each connected to a respective one of said windings.

15. The method of claim 13, wherein said step of monitoring back EMF is performed by a plurality of differential amplifiers and Schmitt tiggers, each connected to a respective one of said windings.

16. A method as defined in claim 13, further comprising the preliminary step, prior to said step (b), of: sequentially exciting all the phases of the motor, each for a fraction of said first interval of time for eliminating static component of friction without moving the rotor from its rest position, before performing said first excitation step of said predefined phase.

17. A method as defined in claim 13, wherein said back electromotive forces induced by the rotor and the motor's windings are digitally read by amplifying each a signal of induced back electromotive force by means of a differential amplifier, feeding the amplified signal to an input of a comparator circuit having an output terminal capable of assuming a logic state in function of the sign of the back electromotive force induced present on the respective winding and by attributing a given weight to the bit representing the output logic state of each comparator; the digitally readable output configuration of the comparators corresponding to a certain angular position of the rotor while it is rotating in a given sense of rotation and assuming a complementary logic value when the rotor travels through the same angular position while it is rotating in an opposite sense of rotation.

18. A method as defined in claim 17, further comprising the step of: utilizing said first reading for decoding the row of a look-up table organized as a matrix of rows and columns and using said second reading for decoding the column of said look-up table, thus identifying the code of the phase to be excited next for accelerating the rotor in the desired sense of rotation with a maximum impulse of torque.

19. A method as defined in claim 17, wherein said first interval of time is shorter than the time necessary for said rotor to cause any two zero-crossings in the sign of any of the back electromotive forces induced in the motor's windings.

20. A circuit for starting-up in a desired sense of rotation a multiphase brushless and sensorless DC motor having multiple stator windings and a rotor, which comprises first means capable of producing a logic signal representative of the sign of back electromotive forces induced in the motor's windings by the rotation of the rotor;

second means capable of generating a signal representative of the occurrence of an inversion of sign of any one of said induced back electromotive forces;

means for decoding through a look-up table of codes of excitable phases of the motor capable of identifying an optimal phase to be excited for accelerating the rotor in a desired direction in function of said logic signals produced by said first means before and after said first zero-crossing event as detected by said second means; at least a first timer started by a start signal and capable of causing the excitation, for a preset first interval of time, of a predefined phase or of a phase functionally shifted by two phase positions from said predefined phase; wherein said first duration is sufficiently short that the rotor travels, during said first duration, through no more than one-half of the angular separation between two adjacent ones of the equilibrium positions, stable or unstable, of all of said phases;

a second timer started by the signal produced by said second means and capable of enabling said first timer to excite said phase shifted by two phase positions from said predefined phase in the case said second means fail to generate said signal before the elapsing of a second interval of time.

21. A circuit as defined in claim 20, wherein said first means are a plurality of signal processing circuits composed of a differential amplifier and a comparator, each differential amplifier and comparator circuit being able to produce on an output node of said comparator said logic signal representative of the sign of the back electromotive force induced in a respective winding of the motor.

22. A circuit as defined in claim 21, wherein said second means comprise a transition detecting circuit capable of detecting a transition of the output voltage of said comparators and of producing a signal representative of such a detected occurrence.

23. An integrated circuit, comprising a circuit in accordance with claim 20 integrated on a single chip together with power transistors.

24. The method of claim 1, further comprising a delay interposed between said steps (a) and (b).

25. The method of claim 7, further comprising a delay interposed between said steps (a) and (b).

26. The method of claim 13, further comprising a delay interposed between said steps (a) and (b).

* * * * *